United States Patent
Hua et al.

(10) Patent No.: US 11,061,558 B2
(45) Date of Patent: Jul. 13, 2021

(54) TOUCH OPERATION RESPONSE METHOD AND DEVICE

(71) Applicant: GUANGDONG OPPO MOBILE TELECOMMUNICATIONS CORP., LTD., Guangdong (CN)

(72) Inventors: Chunqiao Hua, Guangdong (CN); Guojun Sun, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/732,212

(22) Filed: Dec. 31, 2019

(65) Prior Publication Data
US 2020/0133479 A1   Apr. 30, 2020

Related U.S. Application Data

(63) Continuation of application No. PCT/CN2017/101281, filed on Sep. 11, 2017.

(51) Int. Cl.
  *G06F 3/0488*  (2013.01)
  *G06F 3/041*   (2006.01)
  *G06F 3/0484*  (2013.01)

(52) U.S. Cl.
  CPC ........ *G06F 3/04883* (2013.01); *G06F 3/0412* (2013.01); *G06F 3/0416* (2013.01); *G06F 3/0484* (2013.01); *G06F 2203/04106* (2013.01)

(58) Field of Classification Search
  CPC ......... G06F 2203/04106; G06F 3/0412; G06F 3/0416; G06F 3/048; G06F 3/0484; G06F 3/0488; G06F 3/04883
(Continued)

(56) References Cited

U.S. PATENT DOCUMENTS

| 6,201,948 B1 | 3/2001 | Cook et al. |
| 9,041,663 B2 | 5/2015 | Westerman |

(Continued)

FOREIGN PATENT DOCUMENTS

| CN | 102520876 A | 6/2012 |
| CN | 102681779 A | 9/2012 |

(Continued)

OTHER PUBLICATIONS

Extended European search report issued in corresponding European application No. 17924123.7 dated Jul. 6, 2020.

(Continued)

*Primary Examiner* — Tony O Davis

(57) ABSTRACT

A touch operation response method and device in the field of human-computer interaction. The method includes: determining a first operation area and a second operation area in the touch display screen; receiving a first touch operation and a second touch operation acting on the touch display screen within a preset time period; determining an operation area on which the first touch operation acts, where the touch display screen includes the first operation area and the second operation area; determining an operation area on which the second touch operation acts; based on the operation area on which the first touch operation acts and the operation area on which the second touch operation acts, determining whether to respond to the first touch operation and/or the second touch operation.

11 Claims, 19 Drawing Sheets

(58) Field of Classification Search
USPC .................................................. 345/170–178
See application file for complete search history.

(56) References Cited

U.S. PATENT DOCUMENTS

| | | | |
|---|---|---|---|
| 9,158,401 | B2 | 10/2015 | Christiansson et al. |
| 9,244,545 | B2 | 1/2016 | Hinckley et al. |
| 9,710,101 | B2 | 7/2017 | Christiansson et al. |
| 9,910,521 | B2 | 3/2018 | Ahn et al. |
| 10,013,107 | B2 | 7/2018 | Christiansson et al. |
| 2004/0001048 | A1 | 1/2004 | Kraus et al. |
| 2009/0191854 | A1 | 7/2009 | Beason |
| 2010/0095205 | A1 | 4/2010 | Kinoshita |
| 2010/0139990 | A1 | 6/2010 | Westerman et al. |
| 2010/0225595 | A1 | 9/2010 | Hodges et al. |
| 2011/0179387 | A1 | 7/2011 | Shaffer et al. |
| 2012/0262407 | A1 | 10/2012 | Hinckley et al. |
| 2012/0274574 | A1 | 11/2012 | Aono |
| 2013/0106725 | A1 | 5/2013 | Bakken et al. |
| 2013/0154983 | A1 | 6/2013 | Christiansson et al. |
| 2013/0212541 | A1 | 8/2013 | Dolenc et al. |
| 2013/0249829 | A1* | 9/2013 | Hitosuga ............... G06F 3/0488 345/173 |
| 2013/0300704 | A1 | 11/2013 | Takahashi et al. |
| 2013/0307801 | A1 | 11/2013 | Nam |
| 2013/0335333 | A1 | 12/2013 | Kukulski et al. |
| 2014/0232676 | A1* | 8/2014 | Shimizu ............... G06F 3/0418 345/173 |
| 2014/0253444 | A1* | 9/2014 | Cheng ............... H04N 21/4222 345/158 |
| 2014/0292728 | A1* | 10/2014 | Chihara ............... G06F 3/04886 345/178 |
| 2015/0070302 | A1* | 3/2015 | Jogo ............... G06F 3/04886 345/174 |
| 2016/0034099 | A1 | 2/2016 | Christiansson et al. |
| 2016/0253039 | A1 | 9/2016 | Heo et al. |
| 2016/0354500 | A1 | 12/2016 | Dang et al. |
| 2016/0364600 | A1 | 12/2016 | Shah et al. |
| 2017/0046038 | A1 | 2/2017 | Hajas et al. |
| 2017/0153764 | A1* | 6/2017 | Hao ............... G06F 3/04883 |
| 2017/0277336 | A1* | 9/2017 | Yang ............... G06F 3/04186 |
| 2017/0293392 | A1 | 10/2017 | Christiansson et al. |
| 2017/0315720 | A1* | 11/2017 | Sun ............... G06F 3/04883 |
| 2018/0052565 | A1* | 2/2018 | Zhang ............... G06F 3/044 |
| 2018/0173338 | A1* | 6/2018 | Zhang ............... G06F 1/1643 |
| 2018/0188874 | A1 | 7/2018 | Cho et al. |
| 2018/0373389 | A1* | 12/2018 | Tsai ............... G06F 3/04186 |
| 2019/0025977 | A1 | 1/2019 | Christiansson et al. |
| 2019/0079635 | A1* | 3/2019 | Hua ............... G06F 3/0418 |
| 2019/0087079 | A1* | 3/2019 | Wang ............... G06F 3/1423 |
| 2019/0121457 | A1* | 4/2019 | Kakinuma ............... B60K 35/00 |
| 2019/0191042 | A1* | 6/2019 | Yamaguchi ......... H04N 1/00411 |
| 2019/0391723 | A1* | 12/2019 | Wang ............... G06F 3/04186 |
| 2020/0092411 | A1* | 3/2020 | Xu ............... G06K 9/00013 |
| 2020/0133479 | A1* | 4/2020 | Hua ............... G06F 3/048 |
| 2020/0142511 | A1* | 5/2020 | Watanabe ............... G06F 3/0484 |
| 2020/0201518 | A1* | 6/2020 | Jung ............... G06F 3/0488 |
| 2020/0210047 | A1* | 7/2020 | Hua ............... G06F 3/04186 |
| 2020/0218393 | A1* | 7/2020 | Hua ............... G06F 3/0416 |

FOREIGN PATENT DOCUMENTS

| | | |
|---|---|---|
| CN | 102999198 A | 3/2013 |
| CN | 103577029 A | 2/2014 |
| CN | 103616970 A | 3/2014 |
| CN | 104169856 A | 11/2014 |
| CN | 104615303 A | 5/2015 |
| CN | 104615374 A | 5/2015 |
| CN | 104635972 A | 5/2015 |
| CN | 104679362 A | 6/2015 |
| CN | 104714691 A | 6/2015 |
| CN | 104933048 A | 9/2015 |
| CN | 105183235 A | 12/2015 |
| CN | 105245650 A | 1/2016 |
| CN | 105487809 A | 4/2016 |
| CN | 105573637 A | 5/2016 |
| CN | 105653085 A | 6/2016 |
| CN | 105786391 A | 7/2016 |
| CN | 105824559 A | 8/2016 |
| CN | 105867789 A | 8/2016 |
| CN | 105975160 A | 9/2016 |
| CN | 106095280 A | 11/2016 |
| CN | 106406904 A | 2/2017 |
| CN | 106527818 A | 3/2017 |
| CN | 106534555 A | 3/2017 |
| CN | 106598335 A | 4/2017 |
| CN | 106598455 A | 4/2017 |
| CN | 106681637 A | 5/2017 |
| CN | 106708407 A | 5/2017 |
| CN | 106775407 A | 5/2017 |
| CN | 106855782 A | 6/2017 |
| CN | 106855783 A | 6/2017 |
| CN | 106951161 A | 7/2017 |
| CN | 107577415 A | 1/2018 |
| CN | 107608550 A | 1/2018 |
| CN | 107608551 A | 1/2018 |
| KR | 20050088512 A | 9/2005 |
| KR | 20160071663 A | 6/2016 |

OTHER PUBLICATIONS

Extended European search report issued in corresponding European application No. 17924699.6 dated Jul. 7, 2020.
International search report issued in corresponding international application No. PCT/CN2017/101281 dated Jun. 11, 2018.
European search report issued in corresponding European application No. 17924544.4 dated Jun. 4, 2020.
English Translation of First Chinese Office Action dated Apr. 16, 2019 from Application No. 201710813551.3.
English Translation of First Chinese Office Action dated Sep. 26, 2018 from Application No. 201710830133.5.
English Translation of Notification of Registration dated Dec. 19, 2018 for Application No. 201710830133.5.
European search report issued in corresponding European application No. 18193721.0 dated Feb. 19, 2012.
International search report issued in corresponding application No. PCT/CN2018/104997 dated Dec. 13, 2018.
International search report issued in corresponding application No. PCT/CN2017/101285 dated Jun. 11, 2018.
International search report issued in corresponding international application No. PCT/CN2017/101269 dated May 18, 2018.
Non final rejection issued in corresponding U.S. Appl. No. 16/812,911 dated Oct. 29, 2020.
Non final rejection issued in corresponding U.S. Appl. No. 16/812,856 dated Jan. 8, 2021.
India Examination Report issued for IN Application 201834034097 dated Feb. 3, 2021. (6 pages).
Final Office Action for U.S. Appl. No. 16/812,856 dated Apr. 1, 2021. (21 pages).

* cited by examiner

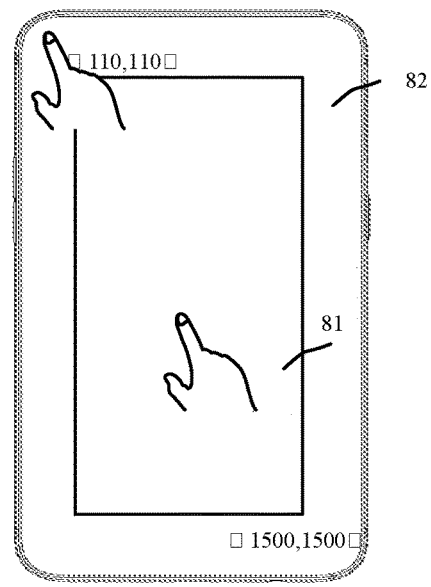

FIG. 8

| First operation area | Second operation area | Response rules |
|---|---|---|
| Touch operation detected | No operation | Respond to the touch operations on the first operation area |
| No operation | Touch operation detected | Respond to the touch operations on the second operation area |
| Touch operation detected | Touch operation detected | Respond to the touch operations on the first operation area, does not respond to the touch operations on the second operation area |

FIG. 9

| First operation area | Second operation area | Response rules |
|---|---|---|
| Touch operation in click type | No operation | respond to the touch operation in click type on the first operation area |
| | Touch operation in click type | |
| | Touch operation in slide type | |
| | Touch operation in long-press type | |
| Touch operation in slide type | No operation | respond to the touch operation in slide type on the first operation area |
| | Touch operation in click type | |
| | Touch operation in slide type | |
| | Touch operation in long-press type | |
| Touch operation in long-press type | No operation | respond to the touch operation in long-press type on the first operation area |
| | Touch operation in click type | respond to the touch operation on the second operation area |
| | Touch operation in slide type | |
| | Touch operation in long-press type | respond to the touch operation in long-press type on the first operation area |
| No operation | Touch operation in click type | respond to the touch operation in click type on the second operation area |
| | Touch operation in slide type | respond to the touch operation in slide type on the second operation area |
| | Touch operation in long-press type | does not respond to any operation |

FIG. 24

TOUCH OPERATION RESPONSE METHOD AND DEVICE

CROSS-REFERENCE TO RELATED APPLICATION(S)

The present application is a continuation application of International Application No. PCT/CN2017/101281, filed on Sep. 11, 2017, the entire disclosure of which is hereby incorporated by reference in its entirety.

TECHNICAL FIELD

The present disclosure relates to the field of human-computer interaction, and in particular, to a touch operation response method and device.

BACKGROUND

In order to improve the utilization proportion of the touch display screen of a mobile terminal, the rims of the front panel of the mobile terminal become narrower and narrower, thereby increasing the screen ratio of the mobile terminal. One way the screen ratio can be expressed is the ratio of the area of the touch display screen to the area of the front panel of the mobile terminal.

For a mobile terminal with narrow rims, when a user holds the mobile terminal, the holding position may be a touch part of the touch display screen, thereby causing the user to touch the edge area of the touch display screen by mistake, and the mobile terminal generating a problem of misjudgment. The edge area of the touch display screen refers to an area located on the upper edge, an area on the left edge, an area on the lower edge, and an area on the right edge of the touch display screen.

At present, the mobile terminal cannot determine whether the operation acting on the edge area of the touch display screen is by mistake. If the mobile terminal directly responds to this operation, it may cause the mobile terminal to perform tasks that the user does not expect to perform, and waste the resources of the mobile terminal.

SUMMARY

The present disclosure provides a touch operation response method and device, which can solve the problem that the mobile terminal responds to operations by mistake and wastes resources of the mobile terminal. The technical solution is as follows:

According to a first aspect of the present disclosure, a touch operation response method is provided. The method is applied to a mobile terminal, and the mobile terminal includes a touch display screen. The method includes:

determining a first operation area and a second operation area in the touch display screen;

receiving a first touch operation and a second touch operation on the touch display screen within a preset time period;

determining an operation area on which the first touch operation is applied, the operation area on which the first touch operation is applied being the first operation area or the second operation area;

determining an operation area on which the second touch operation is applied, the operation area on which the second touch operation is applied being the first operation area or the second operation area; and determining whether responding to the first touch operation or the second touch operation based on the operation area on which the first touch operation is applied and the operation area on which the second touch operation is applied.

According to a second aspect of the present disclosure, a mobile terminal is provided. The mobile terminal includes a processor, a storage medium connected with the processor, and computer-executable instructions stored in the storage medium. The processor executing the instructions is configured to:

determine a first operation area and a second operation area in the touch display screen;

receive a first touch operation and a second touch operation on the touch display screen within a preset time period;

determine an operation area on which the first touch operation is applied, the operation area on which the first touch operation is applied being the first operation area or the second operation area;

determine an operation area on which the second touch operation is applied, the operation area on which the second touch operation is applied being the first operation area or the second operation area; and determine whether responding to the first touch operation or the second touch operation based on the operation area on which the first touch operation is applied and the operation area on which the second touch operation is applied.

The technical solution provided by this present disclosure has the following beneficial effects: when the mobile terminal receives at least two counts of touch operations, it determines whether to respond to the touch operation according to the operation area that each count of touch operation acts on. It solves the problem where the mobile terminal upon receiving a touch operation directly responds to the touch operation, and when the touch operation is an operation by mistake, the operating resources of the mobile terminal is wasted. Because the mobile terminal can, based on determining whether the operation area is an area with a high probability of mistaking touch operations, determine whether to respond to the touch operation, the probability of the mobile terminal responding to operations by mistake is reduced.

In addition, the first operation area and the second operation area are determined in different ways, so that the first operation area and the second operation area can dynamically adapt to the current usage situation of the mobile terminal, and the flexibility of configuration of the first operation area and the second operation area is improved.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

For a better understanding of the aforementioned embodiments of the invention as well as additional embodiments thereof, reference should be made to the Detailed Description of the Embodiments below, in conjunction with the following drawings in which like reference numerals refer to corresponding parts throughout the figures.

FIG. 8 is a schematic diagram illustrating a first operation area and a second operation area according to one example embodiment of the present disclosure.

FIG. 9 is a schematic diagram illustrating response rules according to one example embodiment of the present disclosure.

FIG. 24 is a schematic diagram illustrating response rules according to one example embodiment of the present disclosure.

DETAILED DESCRIPTION

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present disclosure.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not be described in details so as not to unnecessarily obscure aspects of the embodiments.

First, application scenario is described.

Figure 1A:
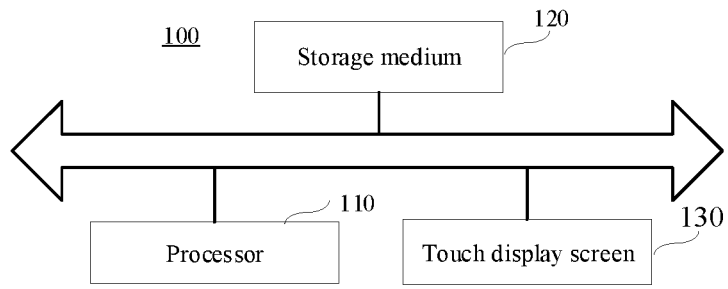
FIG. 1A, FIG. 1B, and FIG. 2 are schematic structural diagrams of a mobile terminal according to one example embodiment of the present disclosure.

Referring to FIG. 1A, it shows a structural block diagram of a mobile terminal 100 provided by an example embodiment of the present disclosure. The mobile terminal 100 may be a mobile phone, a tablet computer, a notebook computer, an e-book, or the like. The mobile terminal 100 in the present disclosure may include one or more of the following components: a processor 110, a storage medium 120, and a touch display screen 130.

The processor 110 may include one or more processing cores. The processor 110 connects various parts of the entire mobile terminal 100 by using various interfaces and lines, and executes or performs the instructions, programs, code sets, or instruction sets stored in the storage medium 120, and deploys the data stored in the storage medium 120, to execute various functions and processing data of mobile terminal 100. Optionally, the processor 110 may use at least one hardware form of Digital Signal Processing (DSP), Field-Programmable Gate Array (FPGA), and Programmable Logic Array (PLA) to implement. The processor 110 may integrate one or a combination of a Central Processing Unit (CPU), a Graphics Processing Unit (GPU), and a modem. Particularly, the CPU mainly handles the operating system, user interface, and application programs; the GPU is responsible for rendering and drawing the content to be displayed by the touch display screen 130; and the modem is used for processing wireless communication. It can be understood that the modem may not be integrated into the processor 110, and may be implemented by a single chip.

The storage medium 120 may include Random Access Memory (RAM), and may also include Read-Only Memory (ROM). Optionally, the storage medium 120 includes a non-transitory computer-readable storage medium. The storage medium 120 may be used to store instructions, programs, codes, code sets, or instruction sets. The storage medium 120 may include a storage program area and a storage data area, where the storage program area may store instructions for implementing an operating system, instructions for at least one function (such as a touch function, a sound playback function, an image playback function, etc.), Instructions for implementing the following method embodiments; the storage data area may store data (such as audio data, phonebook) created according to the use of mobile terminal 100.

Figure 1B:
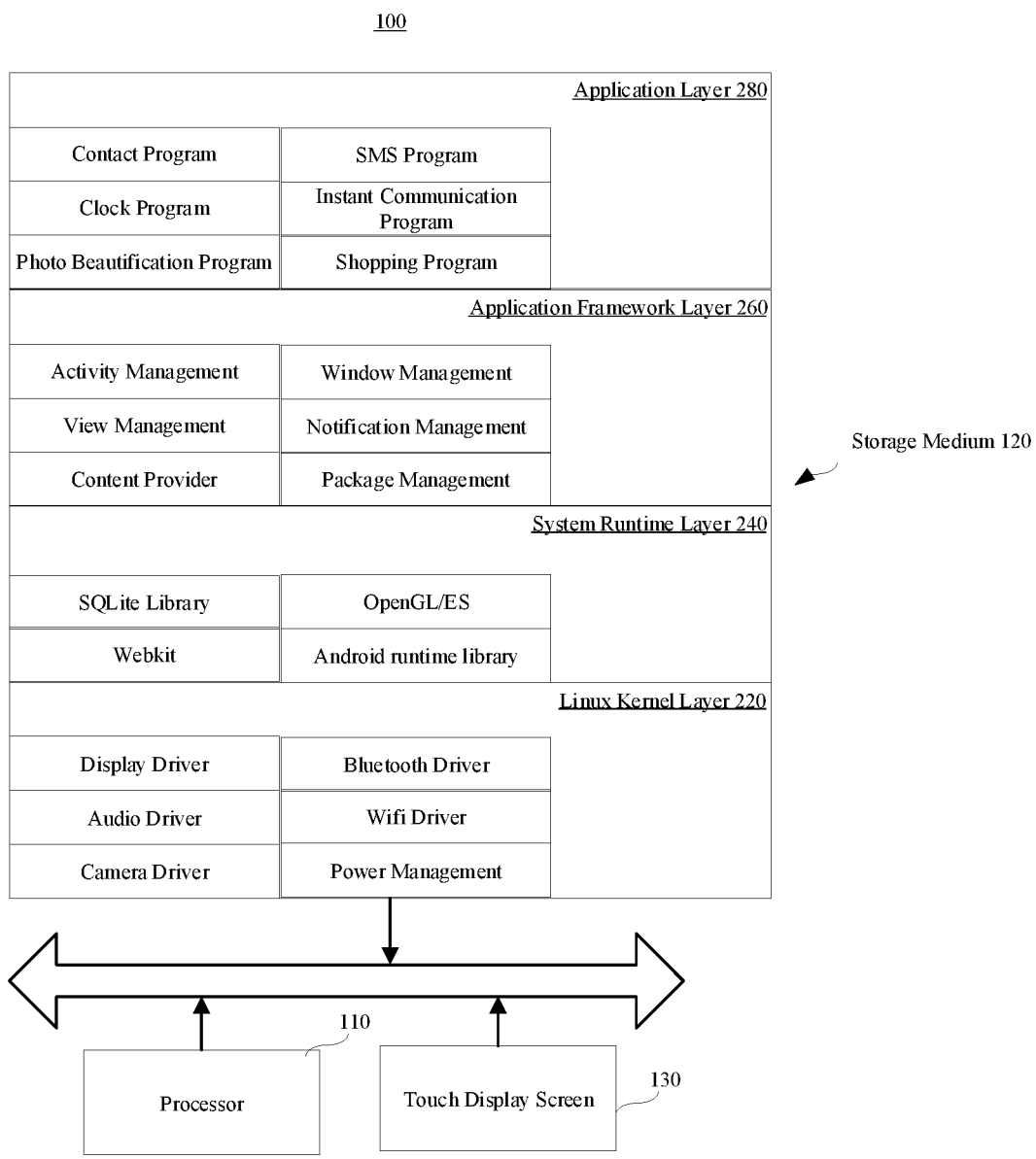

Taking the operating system of an Android system as an example, the programs and data stored in the storage medium 120 are shown in FIG. 1B. The storage medium 120 stores a Linux kernel layer 220, a system runtime layer 240, an application framework layer 260, and an application layer 280. The Linus kernel layer 220 provides low-level drivers for various hardware of the mobile terminal 100, such as display drivers, audio drivers, camera drivers, Bluetooth drivers, Wi-Fi drivers, power management, and so on. The system runtime layer 240 provides major feature support for the Android system through some C/C++ libraries. For example, the SQLite library provides database support, the OpenGL/ES library provides 3D drawing support, and the Webkit library provides browser kernel support. The Android runtime library is also provided in the system runtime layer 240, which mainly provides some core libraries for allowing developers to write Android applications using the Java language. The application framework layer 260 provides various APIs that may be used when building applications. Developers can also use these APIs to build their own applications, such as activity management, window management, view management, notification management, content providers, package management, call management, resource management, and location management. There is at least one application running in the application layer 280. These applications can be contact programs, SMS programs, clock programs, camera applications, etc. that are native to the operating system; they can also be applications developed by third-party developers, such as instant communication programs, photo beautification programs, etc.

Figure 2:
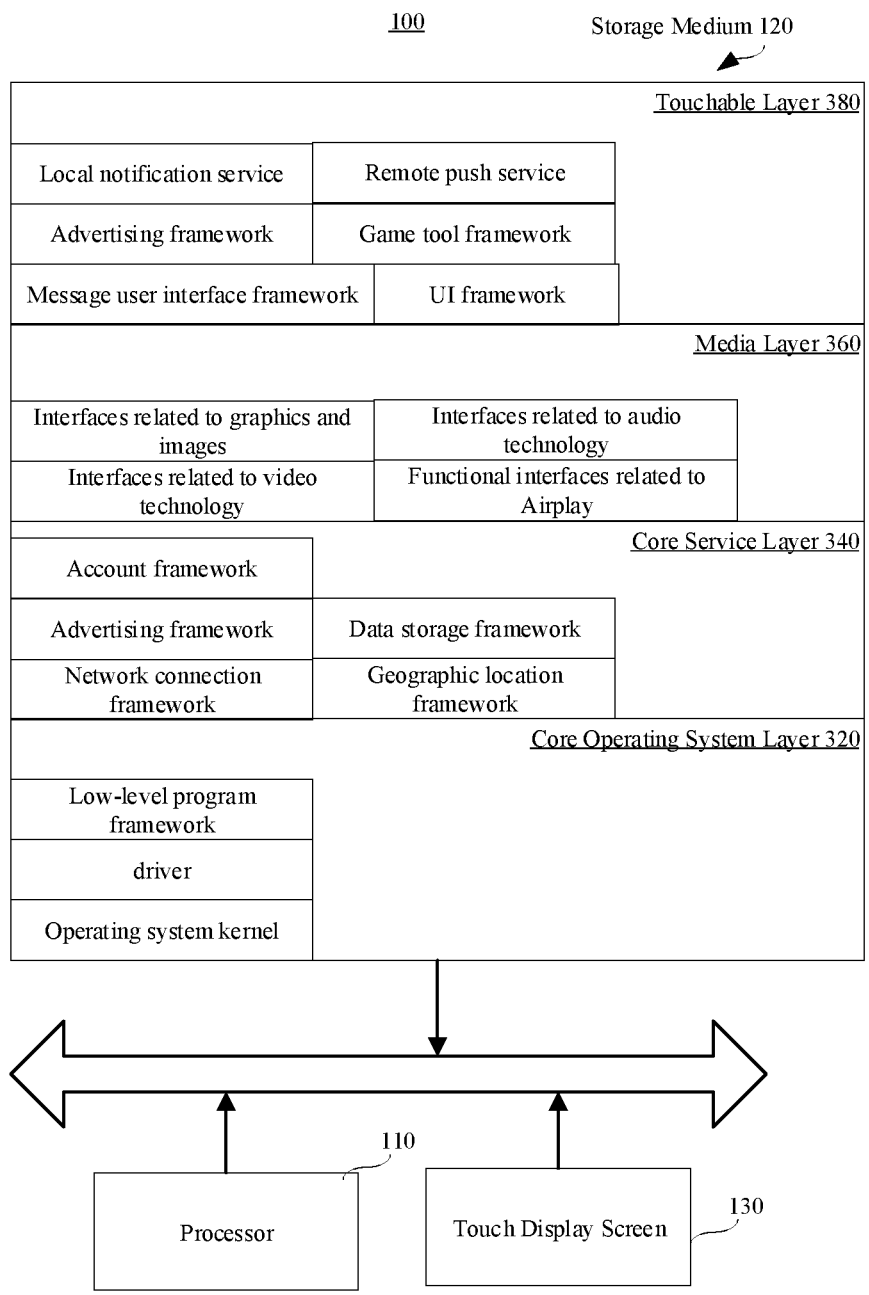
Figure 3A:
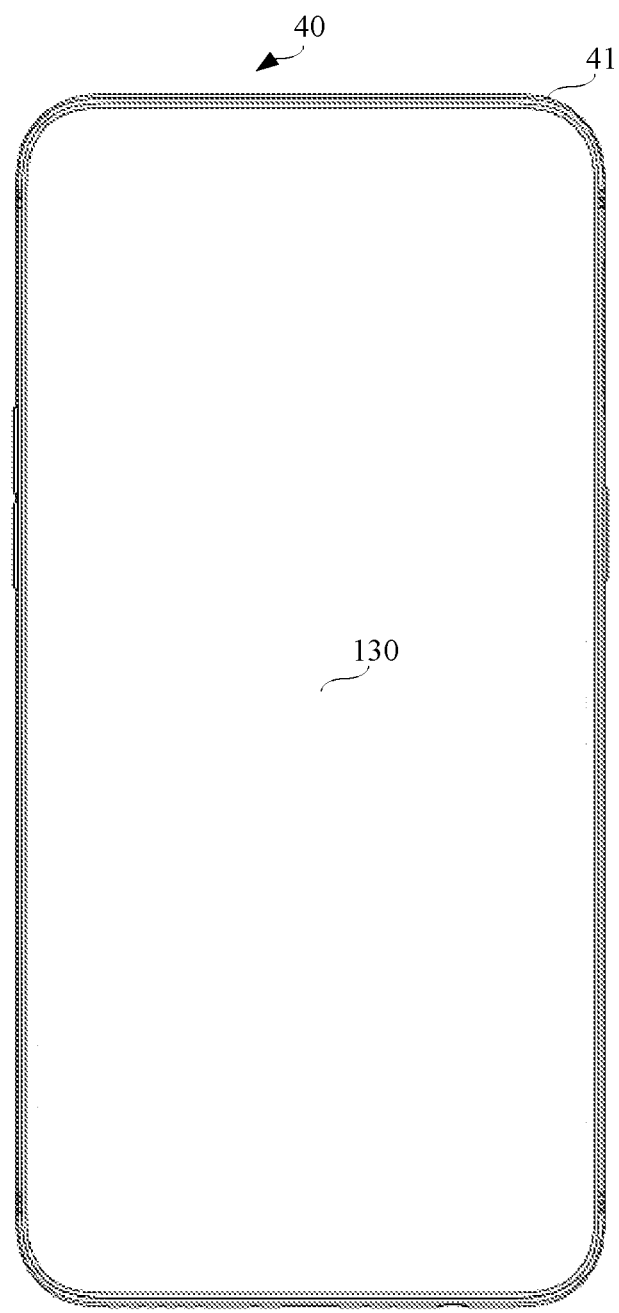
FIG. 3A, FIG. 3B, FIG. 3C, FIG. 3D, FIG. 3E, and FIG. 3F are schematic diagrams illustrating a mobile terminal according to one example embodiment of the present disclosure.
Figure 3B:
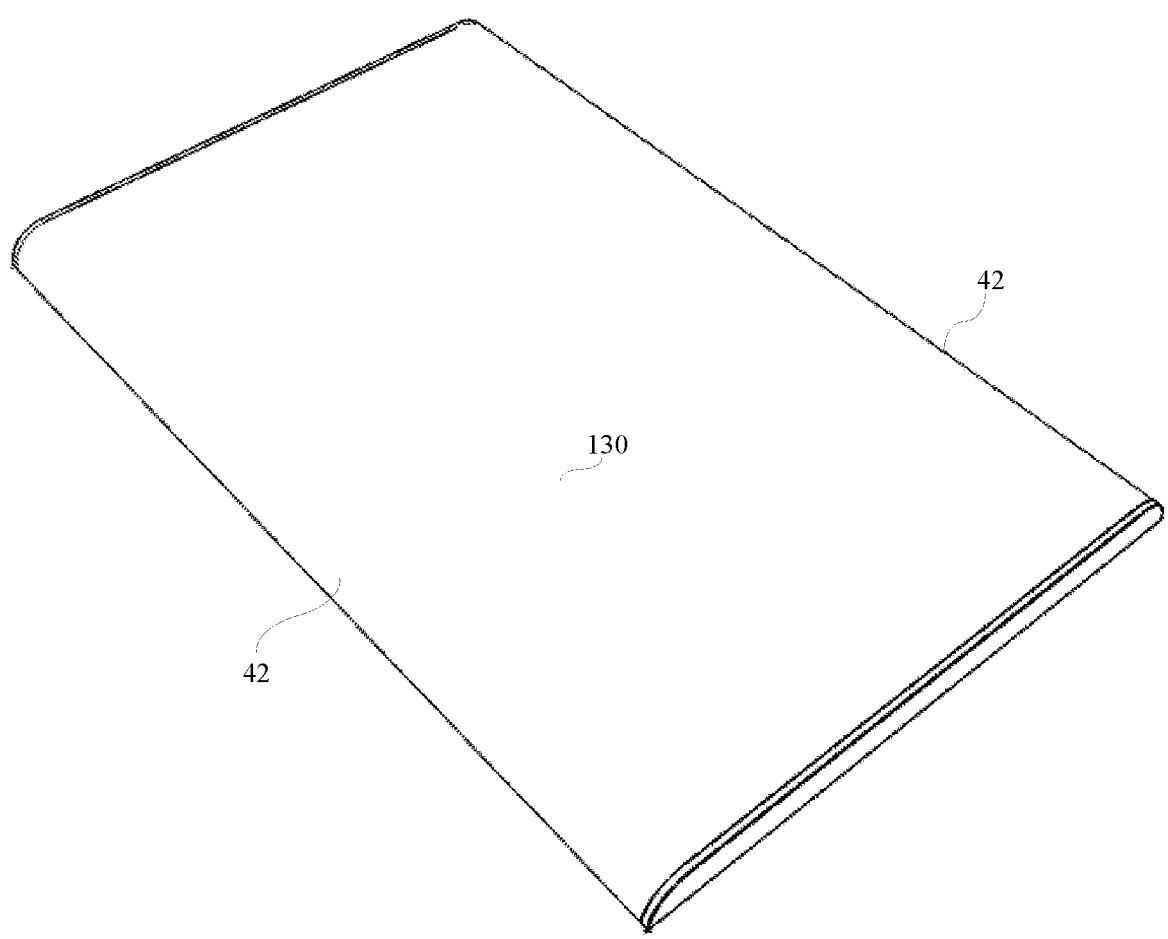
Figure 3C:
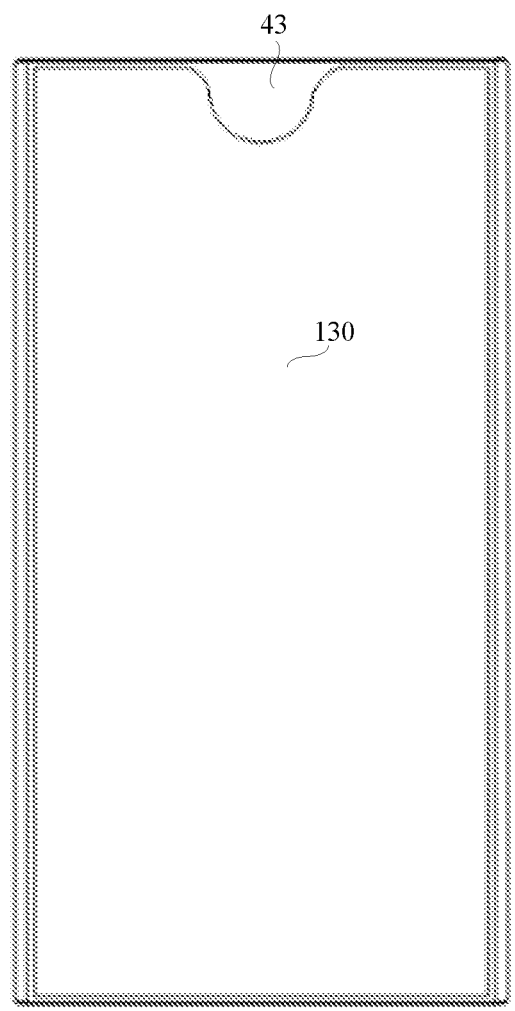
Figure 3D:
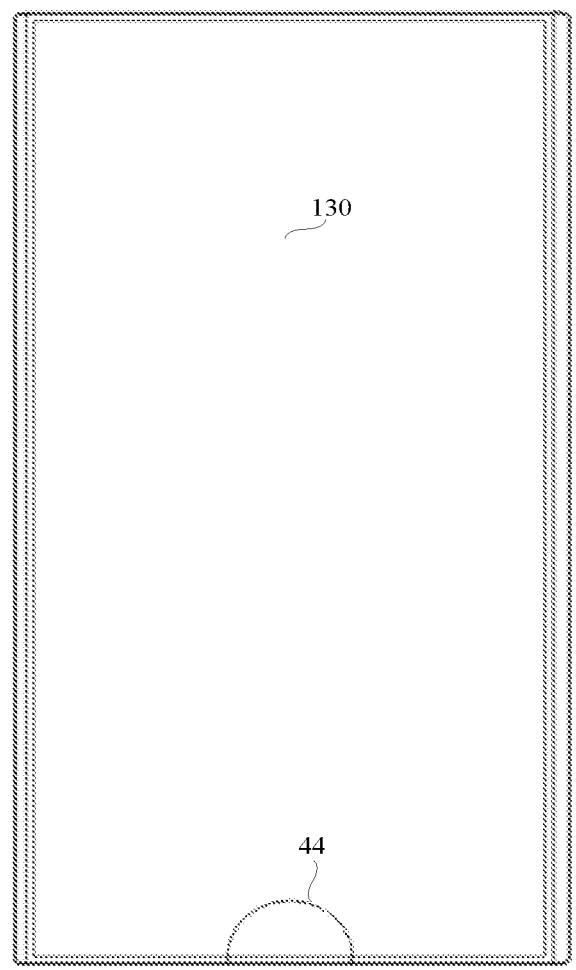
Figure 3E:
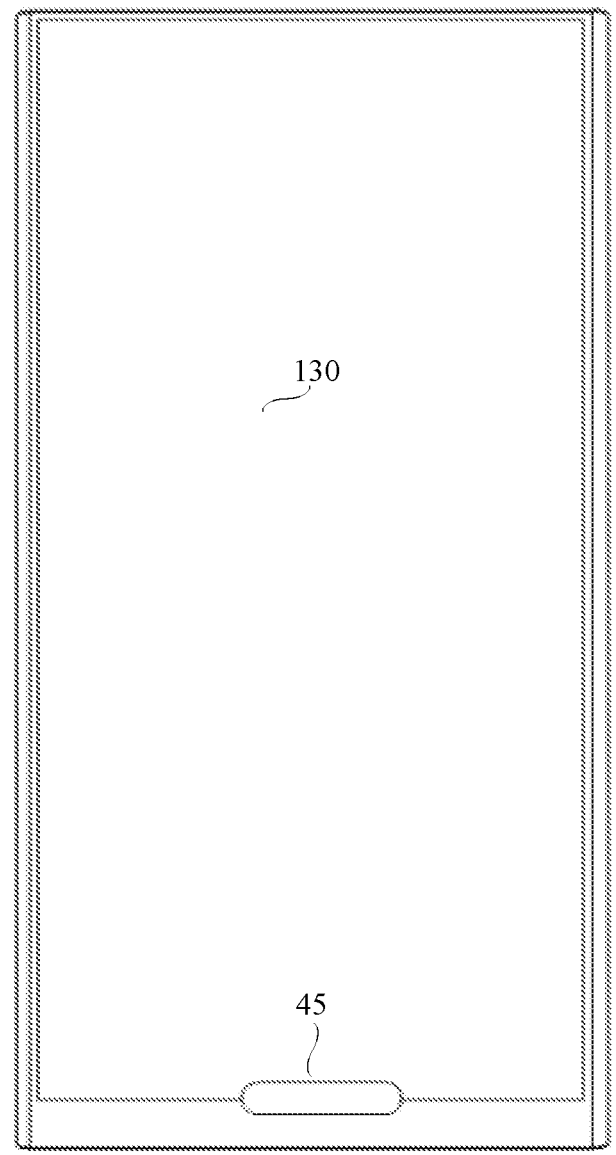
Figure 3F:
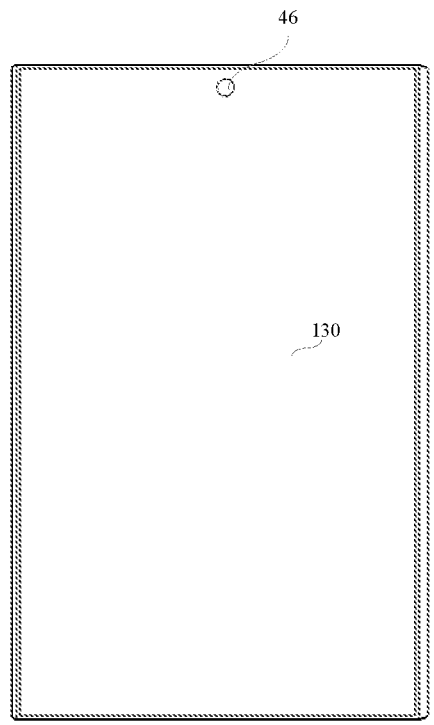

Taking the operating system of an IOS system as an example, the programs and data stored in the storage medium 120 are shown in FIG. 2. The IOS system includes: a core operating system layer 320, a core service layer 340, a media layer 360, and a touchable layer 380. The core operating system layer 320 includes an operating system kernel, drivers, and a low-level program framework. These low-level program frameworks provide functions closer to the hardware for use by the program framework located at the core service layer 340. The core service layer 340 provides system services and/or program frameworks required by the application program, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and wireless playback interfaces for audio and video transmission technologies. The touchable layer 380 provides various commonly-used interface-related frameworks for application development. The touchable layer 380 is responsible for user touch interactive operations on the mobile terminal 100. For example, a local notification service, a remote push service, an advertising framework, a game tool framework, a message user interface framework, a user interface UIKit framework, a map framework, and so on.

Among the frameworks shown in FIG. 3, frameworks related to most applications include, but are not limited to: a basic framework in a core service layer 340 and a UIKit framework in a touchable layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch display screen 130 is used for receiving a touch operation by a user using a finger, a touch pen, or any suitable object on or nearby, and a user interface displaying various applications. The touch display screen 130 is usually disposed on the front panel of the mobile terminal 100. The touch display screen 130 may be designed as a full screen, a curved screen or a special-shaped screen. The touch display screen 130 can also be designed as a combination of a full screen and a curved screen, and a combination of a special-shaped screen and a curved screen, which is not limited in this embodiment.

Full Screen

The full screen may refer to a screen design in which the touch screen display 130 occupies the front panel of the terminal 100 with a screen ratio exceeding a threshold (such as 80% or 90% or 95%). One calculation method of the screen ratio is: the area of the touch display screen 130/the area of the front panel of the mobile terminal 100*100%; another way to calculate the screen ratio is: the diagonal of touch display screen 130/the diagonal of the front panel of terminal 100*100%. In the schematic example shown in FIG. 3A, almost all areas on the front panel of the mobile terminal 100 are touch display screen 130. On the front panel 40 of the mobile terminal 100, all areas other than the edges generated by the middle frame 41 are all touch display screen 130. The four corners of the touch display screen 130 may be right-angled or rounded.

The full screen may also be a screen design in which at least one front panel component is integrated inside or below the touch display screen 130. Optionally, the at least one front panel component includes a camera, a fingerprint sensor, a proximity light sensor, a distance sensor, and the like. In some embodiments, other components on the front panel of the traditional terminal are integrated in all or part of the touch display screen 130. For example, after the photosensitive element in the camera is split into multiple photosensitive pixels, the pixels are integrated in a black area in each display pixel in the touch display screen 130. Since at least one front panel component is integrated inside the touch display screen 130, the full screen has a higher screen ratio.

Of course, in other embodiments, the front panel components on the front panel of the traditional terminal can also be set on the side or back of the mobile terminal 100, such as placing an ultrasonic fingerprint sensor under the touch display screen 130, or a bone-conducting earpiece inside the mobile terminal 100, and the camera arranged on the side of the mobile terminal in a pluggable structure.

In some optional embodiments, when the mobile terminal 100 uses a full screen, a single side of the middle frame of the mobile terminal 100, or two sides (such as left and right sides), or four sides (such as top, bottom, left, and right sides) are provided with edge touch sensors 120. The edge touch sensors 120 are used to detect at least one of a user's touch operation, click operation, press operation, and slide operation on the middle frame. The edge touch sensor 120 may be any one of a touch sensor, a thermal sensor, and a pressure sensor. The user can apply operations on the edge touch sensor 120 to control applications in the mobile terminal 100.

Curved Screen

The curved screen refers to a screen design in which the screen area of the touch display screen 130 is not in a plane. Generally, a curved screen has at least one cross section: the cross section has a curved shape, and the projection of the curved screen in any plane direction perpendicular to the cross section is a flat screen design. The curved shape may be U-shaped. Optionally, the curved screen refers to a screen design manner in which at least one side is a curved shape. Optionally, the curved screen refers to that at least one side of the touch display screen 130 extends to cover the middle frame of the mobile terminal 100. Since the side of the touch display screen 130 extends to the middle frame of the mobile terminal 100, the middle frame without the display function and the touch function is also covered as a displayable area and/or an operable area, so that the curved screen has a higher screen ratio. Optionally, in the example shown in FIG. 3B, the curved screen refers to a screen design in which the left and right sides 42 are curved; or, the curved screen refers to a screen design in which the upper and lower sides are curved; or, curved screen refers to a screen design with four curved sides on the top, bottom, left, and right. In an alternative embodiment, the curved screen is made of a touch screen material with a certain flexibility.

Shaped Screen

The special-shaped screen is a touch display screen with an irregular appearance. The irregular shape is not a rectangle or a rounded rectangle. Optionally, the special-shaped screen refers to a screen design provided with protrusions, notches, and/or holes on the rectangular or rounded rectangular touch display screen 130. Optionally, the protrusion, the notch and/or the hole can be located at the edge of the touch display screen 130, the center of the screen, or both. When the protrusion, notch and/or hole is set on one edge, it can be set at the middle position or both ends of the edge; when the protrusion, notch and/or hole is set on the center of the screen, it can be set in one or more of the areas: the area above the screen, the upper left area, the left area, the lower left area, the lower area, the lower right area, the right area, and the upper right area. When arranged in multiple areas, the protrusions, notches and digging holes can be distributed in a centralized or distributed manner; they can be distributed symmetrically or asymmetrically. Optionally, the number of the protrusions, notches and/or dig holes is not limited.

Because the special-shaped screen covers the upper and/or lower forehead area of the touch display screen as a displayable area and/or an operable area, so that the touch-screen display takes up more space on the front panel of the terminal, having a larger screen ratio. In some embodiments, the notches and/or holes are used to receive at least one front panel component, which includes at least one of a camera, fingerprint sensor, proximity light sensor, distance sensor, handset, ambient light sensor, or physical buttons.

Schematically, the notch may be provided on one or more edges, and the notch may be a semi-circular notch, a right-angled rectangular notch, a rounded rectangular notch, or an irregularly-shaped notch. In the example shown schematically in FIG. 3C, the special-shaped screen may be a screen design provided with a semi-circular notch 43 at the center of the upper edge of the touch display screen 130. The space vacated by the semi-circular notch 43 is used for accommodating at least one front panel component of a camera, a distance sensor (also known as a proximity sensor), a handset, and an ambient light brightness sensor. As shown schematically in FIG. 3D, the special-shaped screen may be designed that a semi-circular notch 44 is located on the central position of the lower edge of the touch display screen 130. The space vacated by the semi-circular notch 44 is used to accommodate at least one component of a physical button, a fingerprint sensor, and a microphone. As shown schematically in the example of FIG. 3E, the special-shaped screen may be a screen design provided with a semi-elliptical notch 45 in the center of the lower edge of the touch display screen 130. A semi-elliptical notch is formed on the front panel of the mobile terminal 100, and two semi-elliptical notches surround to form an elliptical area. The elliptical area is used to accommodate physical keys or fingerprint identification modules. In the example shown schematically in FIG. 3F, the shaped screen can be a screen design having at least one small hole 45 in the upper half of the touch display screen 130, and the space vacated by the small hole 45 is used to accommodate at least one front panel component of a camera, a distance sensor, a handset, and an ambient light sensor.

In addition, those skilled in the art can understand that the structure of the mobile terminal 100 shown in the above drawings does not constitute a limitation on the mobile terminal 100. The mobile terminal may include more or fewer components than shown in the drawings, or combine certain components, or different component arrangements. For example, the mobile terminal 100 further includes components such as a radio frequency circuit, an input unit, a sensor, an audio circuit, a WIFI module, a power supply, and a Bluetooth module, and details are not described herein again.

Some terms of the present disclosure are described.

Click type touch operation: refers to a touch operation where the touch position on the touch display screen is fixed within a first touch duration. The first touch duration is usually shorter, for example: 500 ms.

Optionally, the touch operation of the click type may be a click operation, a double-click operation, or the like.

Figure 4:
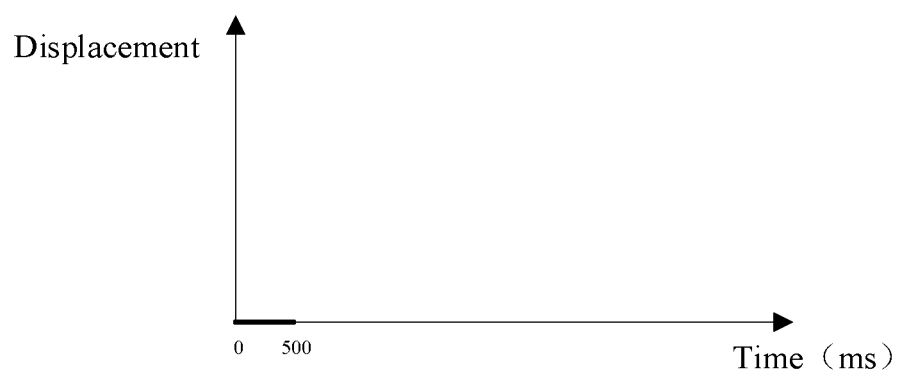
FIG. 4 is a schematic diagram illustrating a touch position and displacement according to one example embodiment of the present disclosure.

Referring to FIG. 4, the relationship between the time and displacement of the click type touch operation is shown. It can be known from FIG. 4 that within 500 ms, the touch position of the touch operation does not change, and the displacement is 0 (indicated by a bold line in FIG. 1).

Optionally, in this embodiment, the click type touch operation may have a short displacement within the first sub-duration of the first touch duration, and a fixed displacement within the second sub-duration, and a ratio of the first sub-duration to the first touch duration is smaller than a first ratio, i.e., the touch operation of the click type is a touch operation based on a click.

Optionally, the first ratio is a value greater than 0 and less than 1, such as 0.5, 0.3, and 0.1. This embodiment does not limit the value of the first ratio.

Slide type touch operation: refers to a touch operation where the touch position on the touch display screen is not fixed within the second touch duration. The second touch duration is greater than the first touch duration, for example: 1 second.

Figure 5:
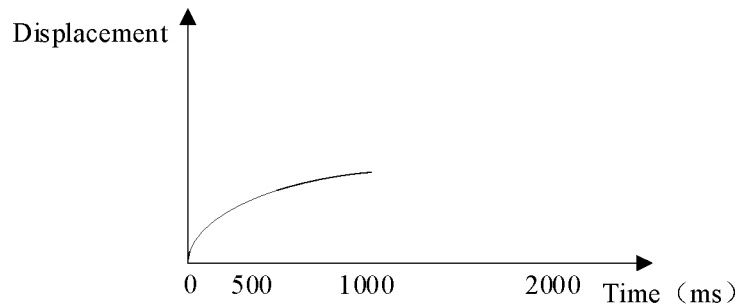
FIG. 5 is a schematic diagram illustrating a touch position and displacement according to one example embodiment of the present disclosure.

Referring to FIG. 5, the relationship between the time of the slide type touch operation and the touch position is shown. Tt can be known from FIG. 5 that, within 1 second, the touch position of the touch operation is not fixed and the displacement changes.

Optionally, in this embodiment, the slide type touch operation may have a change in displacement in the third sub-duration of the second touch duration, and the displacement in the fourth sub-duration is fixed. And a ratio of the fourth sub-duration to the second touch duration is smaller than the second ratio, i.e., the slide type touch operation is a slide-based touch operation.

Optionally, the second ratio is a value greater than 0 and less than 1, such as 0.5, 0.3, and 0.1. The second ratio may be equal to the first ratio or may be different from the first ratio. This embodiment does not limit the value of the second ratio.

Long-press type touch operation: refers to a touch operation where the touch position on the touch display screen is fixed during the third touch duration. Third touch duration is greater than first touch duration, for example: 2 s.

Figure 6:
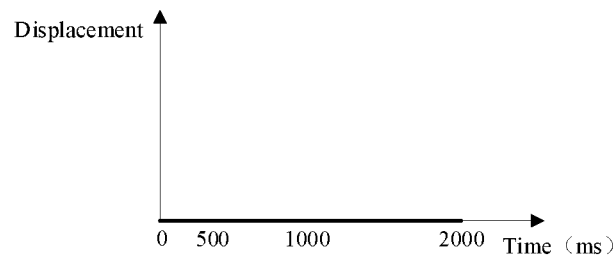
FIG. 6 is a schematic diagram illustrating a touch position and displacement according to one example embodiment of the present disclosure.

Referring to FIG. 6, the relationship between the time and touch position of the long-press type touch operation is shown. It can be known from FIG. 6 that within 2 seconds, the touch position of the touch operation is fixed and the displacement is 0.

Optionally, in this embodiment, a long-press type touch operation may have a change in displacement within a fifth sub-duration of the third touch duration, and a displacement within the sixth sub-duration is fixed. And a ratio of the fifth sub-duration to the third touch duration is smaller than the third ratio, i.e., a long-press type touch operation is a touch operation based on a long-press.

Optionally, the third ratio is a value greater than 0 and less than 1, such as 0.5, 0.3, and 0.1. The third ratio may be the same as the first ratio or may be different from the first ratio. This embodiment does not limit the value of the third ratio.

Operation area: an area in the touch display screen that supports responding to the received touch operation. Optionally, all areas on the touch display screen of the mobile terminal are operation areas.

Optionally, when the rims of the touch display screen are narrow, during use, the palm and/or fingers of the user may accidentally touch the edge area of the touch display screen, resulting in operations by mistake. Based on this technical problem, the present disclosure provides the following technical solutions to identify operations by mistake by users and save mobile terminal resources.

Optionally, the present disclosure uses the mobile terminal as an example for description. The touch display screen of the mobile terminal is any one of the above-mentioned full screen, curved screen, and special-shaped screen, or it may be other types of touch display screen. Optionally, the width of the rims of the touch display screen of the mobile terminal is smaller than a preset threshold, for example, the width of the rims of the curved screen is 0.

Figure 7:
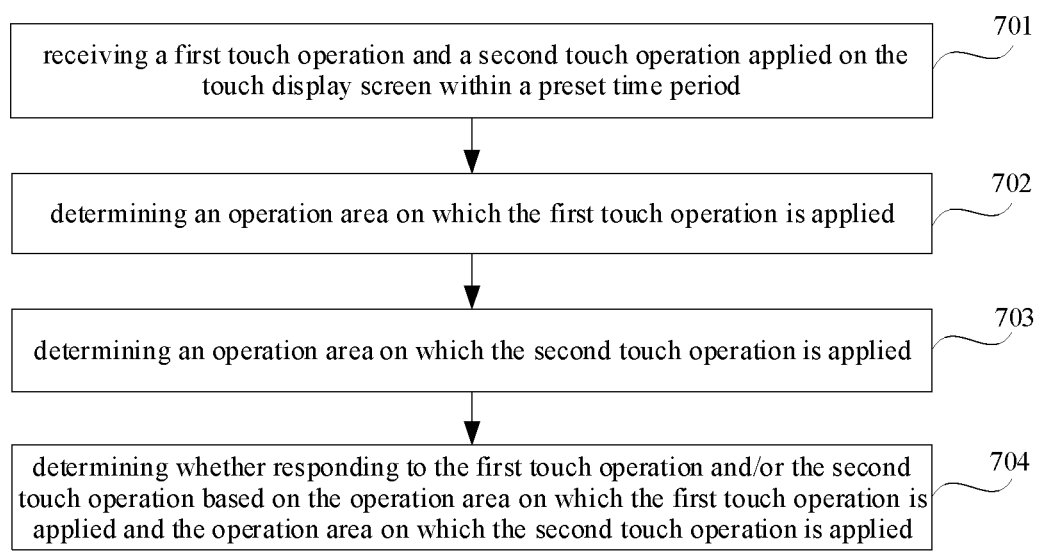
FIG. 7 is a schematic flowchart of a touch operation response method according to one example embodiment of the present disclosure.

Referring to FIG. 7, a flowchart of a touch operation response method in accordance with an example embodiment of the present disclosure is provided. The touch operation response method includes the following steps.

At 701: receiving a first touch operation and a second touch operation applied on the touch display screen within a preset time period.

Optionally, a touch sensor is provided in the touch display screen of the mobile terminal, and the touch sensor detects whether there is a touch operation in real time or periodically. When the touch sensor detects a touch operation, a touch event corresponding to the touch operation is sent to the processor. The processor recognizes the operation type of the touch operation and/or the touch position according to the touch event.

Optionally, the operation type of the touch operation may be at least one of a click type, a slide type, and a long-press type.

Specifically, the preset time period is usually short, for example: 100 ms, i.e., it can be considered that the mobile terminal receives both the first touch operation and the second touch operation at the same time.

Optionally, in this embodiment, the first touch operation and the second touch operation are used to indicate different touch operations, and do not represent the number of touch operations and/or the receiving order. For example, the mobile terminal receives three counts of touch operations on the touch display screen. The first count of touch operation is the first touch operation, and the second count of touch operation or the third count of touch operation is the second touch operation.

At 702: determining an operation area on which the first touch operation is applied.

The touch display screen includes a first operation area and a second operation area. The operation area on which the first touch operation is applied is one of the first operation area and the second operation area.

Optionally, in the present disclosure, the mobile terminal determines the operation area on which the touch operation acts (including the first touch operation and the second touch operation), including: detecting whether the touch position of the touch operation belongs to the position range corresponding to the first operation area; if the touch position of the touch operation belongs to the position range corresponding to the first operation area, then determines that the operation area on which the touch operation acts is the first operation area; if the touch position of the touch operation does not belong to the position range corresponding to the first operation area, then determines that the operation area on which the touch operation acts is the second operation area.

Optionally, the mobile terminal also determines whether the touch position of the touch operation belongs to the position range corresponding to the second operation area. If the touch position of the touch operation belongs to the position range corresponding to the second operation area, then determines that the operation area on which the touch operation acts is the second operation area; if the touch position of the touch operation does not belong to the position range corresponding to the second operation area, then determines that the operation area on which the touch operation acts is the first operation area.

Optionally, the position range of the first operation area is a coordinate set composed of at least one coordinate. Schematically, the position range of the first operation area is {(100, 100), (1500, 1500)}, indicating that a range from position (100, 100) to position (1500, 1500) belongs to the first operation area.

Optionally, the position range of the second operation area is determined according to the position range of the first operation area, i.e., the position range of the second operation area is an operation area other than the first operation area.

Optionally, the coordinates of each position are determined according to the positions of pixel points. For example: position (100, 100) represents the pixel point of the 100th row and the 100th column.

Referring to FIG. 8, the touch display screen is divided into a first operation area 81 and a second operation area 82. The position range of the first operation area 81 is {(110, 110), (1500, 1500)}, and the position range of the second operation area is the operation area other than first operation area 81 in the touch display screen. If there are two counts of touch operations on the touch display screen. the touch position of the first count of touch operation is (900, 900), which belongs to the position range of the first operation area 81, and the touch position of the second count of touch operation is (20, 20)), which does not belong to the position range of the first operation area 81, then it is determined that the operation area on which the first count of touch operation is applied is the first operation area, and the operation area on which the second count of touch operation is applied is the second operation area.

Optionally, in this embodiment, only the touch position of the touch operation is represented by one coordinate as an example. In actual implementations, the touch position of the touch operation may also be represented by a coordinate set, and the mobile terminal, according to the coordinate set, calculates the average of the x-axis and y-axis respectively to obtain the average coordinates; determine the operation area on which the touch operation acts based on the average coordinates.

For example: the touch positions of a touch operation are {(900, 900), (900, 901), (900, 902), (901, 900), (901, 901), (901, 902), (902, 900), (902, 901), (902, 902)}, then the average value of the x-axis is (900+900+900+901+901+901+901+902+902+902)/9=901; the average value of the y-axis is (900+900+900+901+901+901+901+902+902+902)/9=901; then the average coordinate is (901, 901), which belongs to the position range of the first operation area, and it is determined that the position on which the touch operation acts is the first operation area.

Optionally, when the position of a touch operation is represented by a coordinate set, if all the coordinates in the coordinate set or coordinates exceeding a predetermined proportion belong to the same operation area, it is determined that the position on which the touch operation acts is the operation area.

At 703: determining an operation area on which the second touch operation is applied.

The operation area on which the second touch operation acts is one of the first operation area and the second operation area.

For a detailed description of this step, please refer to step 702, which is not described in this embodiment.

At 704: determining whether responding to the first touch operation and/or the second touch operation based on the operation area on which the first touch operation is applied and the operation area on which the second touch operation is applied.

Optionally, response rules corresponding to the operation area are preset in the mobile terminal. The response rules are used to indicate whether to respond to a touch operation on the first operation area and the second operation area. The mobile terminal determines whether to respond to the first touch operation and/or the second touch operation according to the response rules corresponding to the operation area operated by the first touch operation and the operation area operated by the second touch operation.

Referring to FIG. 9, response rules corresponding to the operation area are provided. When the first touch operation acts on the first operation area and the second touch operation acts on the second operation area, the mobile terminal responds to the first touch operation and does not respond to the second touch operation.

Optionally, a response priority corresponding to an operation area is preset in the mobile terminal. Specifically, a response priority of a touch operation acting on a first operation area is higher than a response priority of a touch operation acting on a second operation area. The mobile terminal determines whether to respond to the first touch operation and/or the second touch operation according to the response priority corresponding to the operation area on which the first touch operation acts and the response priority corresponding to the operation area on which the second touch operation acts.

Schematically, the operation area of the first touch operation is the first operation area, and the operation area of the second touch operation is the second operation area. Since the response priority corresponding to the first operation area is higher than the response priority corresponding to the second operation area, the mobile terminal responds to the first touch operation, and does not respond to the second touch operation; or, the mobile terminal responds to the first touch operation, and after responding to the first touch operation, responds to the second touch operation.

Specifically, the response priority corresponding to the first operation area refers to the response priority of the touch operation acting on the first operation area; the response priority corresponding to the second operation area refers to the response priority of the touch operation acting on the second operation area.

Overall, the touch operation response method provided in this embodiment, when the mobile terminal receives at least two counts of touch operations, determines whether to respond to a touch operation according to the operation area on which each count of the touch operations acts, solving the problem of wasting the operating resources of the mobile terminal caused by mistaking touch operation when the mobile terminal responds directly to the touch operation as long as a touch operation is received. Because the mobile terminal can determine, based on whether the operation area is an area with a high probability of operations by mistake, whether to respond to the touch operation, thereby reducing the probability of the mobile terminal responding to operations by mistake.

Optionally, in the present disclosure, a mobile terminal responding to a touch operation (including a first touch operation and/or a second touch operation) refers to performing a task indicated by a touch operation. For example: a touch operation is a click operation that clicks on an application icon on the desktop, then the mobile terminal responds to the touch operation by running the application in the foreground. Another example: a touch operation is a long-press operation on a voice input option. The mobile terminal responds to the touch operation by starting the audio recording function. For another example: if the touch operation is a sliding operation on the contact's display page, the mobile terminal responds to the touch operation according to the sliding distance and the sliding orientation, and scrolls the contacts page to show more contacts. Of course, the mobile terminal can perform other tasks when responding to the touch operation, and this embodiment will not list them one by one here.

Optionally, in the foregoing embodiments, because the edge area of the touch display screen is generally an area with a high probability of operations by mistake, the second operation area is located at the edge area of the touch display screen. The touch display screen includes four edge areas: the upper edge area, the lower edge area, the left edge area, and the right edge area; the second operation area includes at least one of the four edge areas; the first operation area is the area other than the second operation area in the touch display screen.

Referring to FIG. 8, the second operation area 82 includes four edge areas, and the first operation area 81 is the area other than the second operation area 82 in the touch display screen.

Optionally, the shape of the first operation area may be rectangular, rounded rectangle, circle, ellipse, irregular shape, etc. Accordingly, the shape of the second operation area is determined according to the shape of the first operation area.

Figure 10:
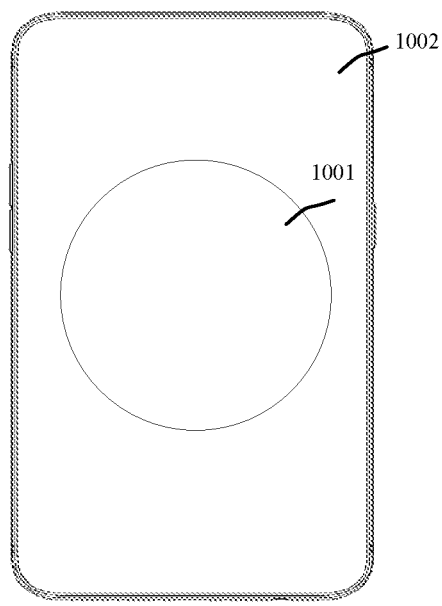
FIG. 10 is a schematic diagram illustrating a first operation area and a second operation area according to one example embodiment of the present disclosure.

Referring to FIG. 10, the shape of the first operation area 1001 is circular, and areas other than the first operation area 1001 in the touch display screen are all second operation area 1002.

Optionally, the shape of the first operation area and/or the second operation area is set by the mobile terminal by default; or, the shape is selected by the user, which is not limited in this embodiment.

Optionally, the size of the first operation area and/or the second operation area is set by the mobile terminal by default; or it is selected by the user, which is not limited in this embodiment.

In this embodiment, by setting the edge areas with a higher probability of touching by mistake as the second operation area, and setting the areas other than the second operation area as the first operation area, since the response priority corresponding to the first operation area is higher than the response priority corresponding to the second operation area, therefore, when the mobile terminal receives touch operations on the first operation area and second operation area respectively, it can respond preferentially to touch operations on the first operation area, thereby reducing the probability of the mobile terminal preferentially responding to operations by mistake.

Optionally, depending on different ways the user uses the mobile terminal, the area where a touch operation by mistake acts in the touch display screen may be different. For example: when the user uses a right hand for holding the mobile terminal, the probability of accidentally touching the right edge area of the touch display screen is greater. At this time, if the position and/or size of the first operation area and the second operation area in the touch display screen are fixed, and the second operation area includes fewer right edge areas, or even does not include the right edge area, the mobile terminal may still respond to operations by mistake. In order to reduce the probability of the mobile terminal responding to operations by mistake, in this present disclosure, the mobile terminal also determines the first operation area and second operation area in the touch display screen in advance according to the current usage situation.

Optionally, the use situation of the mobile terminal includes, but is not limited to, at least one of a holding mode corresponding to the mobile terminal, a display mode of the mobile terminal, and an implementation scenario of the mobile terminal.

The holding mode corresponding to the mobile terminal refers to the way the user holds the mobile terminal. The holding mode includes: right-hand holding, left-hand holding, and two-hand holding.

The display mode of mobile terminal includes horizontal screen display and vertical screen display.

Figure 11:
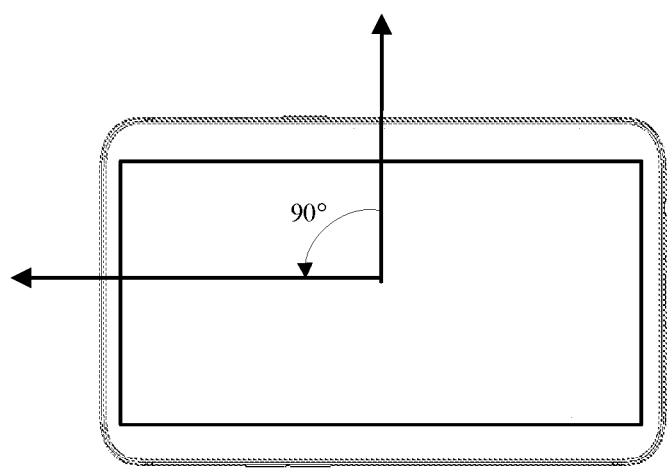
FIG. 11 is a schematic diagram illustrating a display mode according to one example embodiment of the present disclosure.
Figure 12:
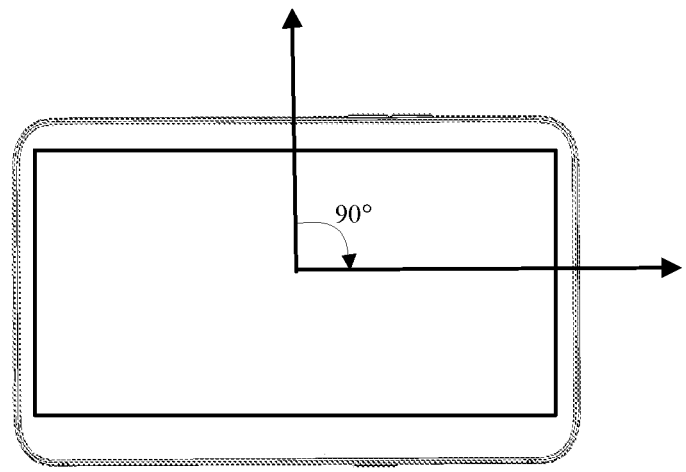
FIG. 12 is a schematic diagram illustrating a display mode according to one example embodiment of the present disclosure.

Horizontal screen display refers to a display mode where the display interface of the mobile terminal is rotated 90 degrees to the left or right with the center point as the axis. Optionally, in this present disclosure, the display mode in which the display interface is rotated 90 degrees to the left with the center point as the axis is referred to as a positive horizontal screen display. Referring to FIG. 11, the display interface is rotated 90 degrees to the left with the center point as the axis; the display mode in which the display interface is rotated 90 degrees to the right with the center point as the axis is referred to as an inverted horizontal screen display. Referring to FIG. 12, the display interface is rotated 90 degrees to the right with the center point as the axis.

Optionally, the present disclosure merely illustrates an example, i.e., a display mode in which the display interface is rotated 90 degrees to the left with the center point as the axis is a positive horizontal screen display and a display model in which the display interface is rotated 90 degrees to the right with the center point as the axis is an inverted horizontal screen display. In actual implementations, a display mode in which the display interface is rotated 90 degrees to the left with the center point as the axis may be implemented as an inverted horizontal screen display, and a display in which the display interface is rotated 90 degrees to the right with the center point as the axis may be implemented as a positive horizontal screen display, which is not limited in this present disclosure.

Figure 13:
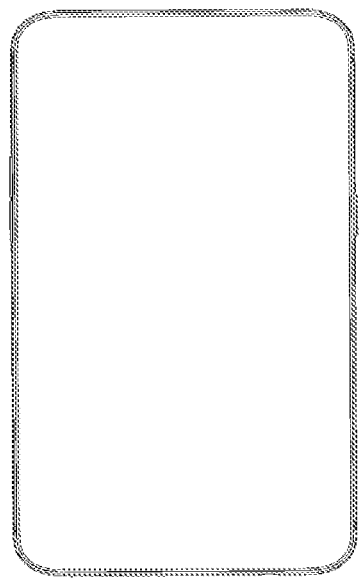
FIG. 13 is a schematic diagram illustrating a display mode according to one example embodiment of the present disclosure.
Figure 14:
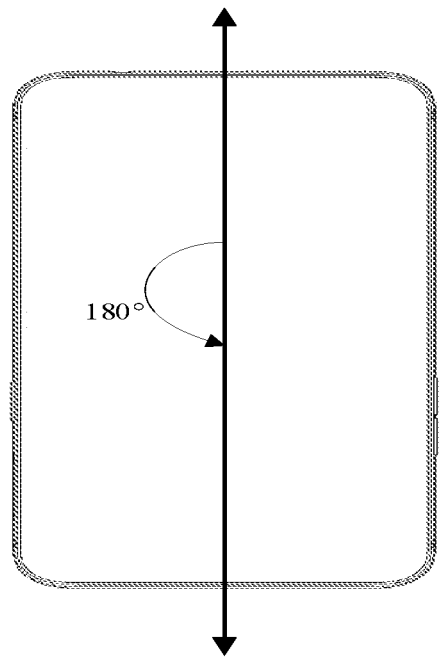
FIG. 14 is a schematic diagram illustrating a display mode according to one example embodiment of the present disclosure.

Vertical screen display refers to a display mode in which the display interface of the mobile terminal is not rotated, or is rotated 180 degrees with the center point as the axis. Optionally, in this present disclosure, the display mode in which the display interface does not rotate is referred to as a positive vertical screen display. Referring to FIG. 13, the display interface is not rotated. The display mode in which the display interface is rotated 180 degrees with the center point as the axis is referred to as an inverted vertical screen display. Referring to FIG. 14, the display interface is rotated 180 degrees with the center point as the axis.

Optionally, the present disclosure merely illustrates an example, i.e., the display mode in which the display interface does not rotate is positive vertical screen display and the display model in which the display interface is rotated by 180 degrees with the center point as the axis is an inverted vertical screen display. In actual implementations, the display mode in which the display interface does not rotate may be implemented as the inverted vertical screen display, and the display model in which the display interface is rotated by 180 degrees with the center point as the axis is the positive vertical screen display, which is not limited in the present disclosure.

The implementation scenario of the mobile terminal includes applications currently running on the mobile terminal.

Figure 15:
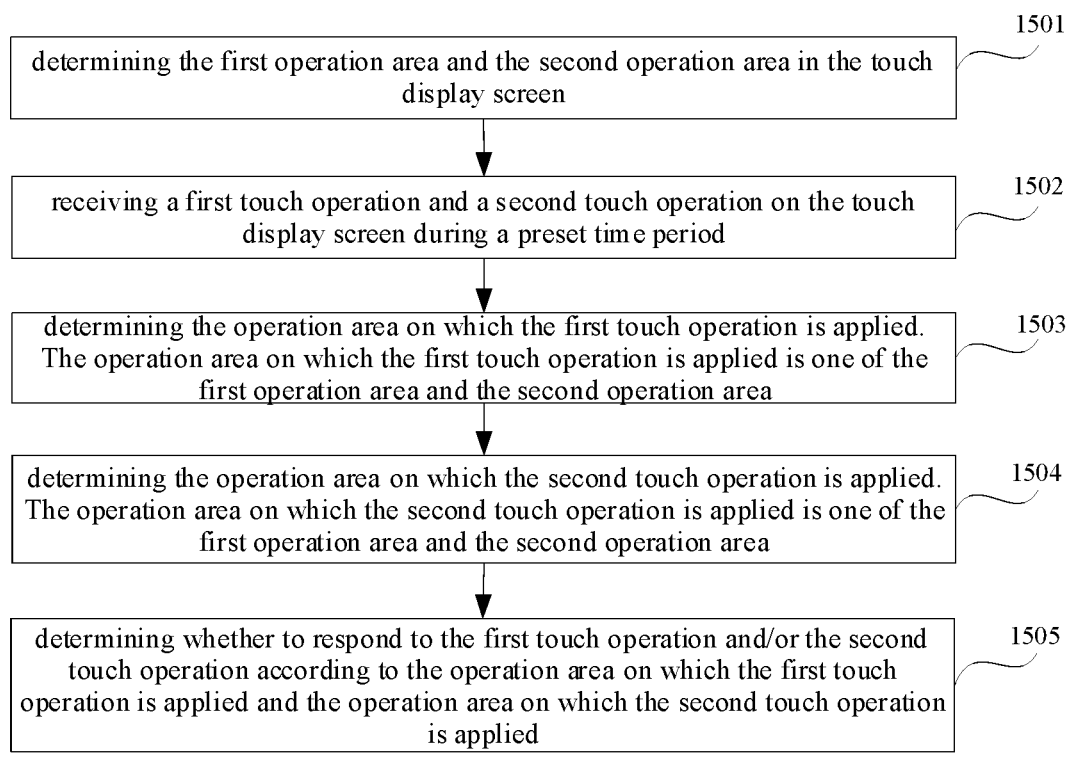
FIG. 15 is a schematic flowchart of a touch operation response method according to one example embodiment of the present disclosure.

FIG. 15 is a flowchart illustrating a touch operation response method according to another example embodiment of the present disclosure. The touch operation response method includes the following steps.

At 1501: determining the first operation area and the second operation area in the touch display screen.

Optionally, the manner in which the mobile terminal determines the first operation area and second operation area in the touch display screen includes but is not limited to the following:

First manner: determining the holding mode corresponding to the mobile terminal; determining the first operation area and second operation area according to the holding mode.

Optionally, the ways in which the mobile terminal determines the holding mode of the mobile terminal includes but is not limited to the following:

First way: the mobile terminal determines the holding mode based on the received fingerprint information of the touch operation.

The mobile terminal has pre-stored template information of the left-hand fingers and template information of the right-hand fingers. A fingerprint sensor is provided in the touch display screen of the mobile terminal, and the fingerprint sensor is used to collect fingerprint information of a touch operation on the touch display screen. When the mobile terminal receives a touch operation, it collects the fingerprint information of the touch operation through a fingerprint sensor and matches the fingerprint information with the template information. If the fingerprint information collected at Nth time matches the template information of the left-hand fingers, it is determined that the holding mode is left-hand holding. If the fingerprint information collected at Nth time matches the template information of the right-hand fingers, then it is determined that the holding mode is right-hand holding; if the fingerprint information collected at Nth time matches the template information of the left-hand fingers, while also matches the template information of the right-hand fingers, it is determined that the holding mode is two-hand holding.

Second way: the mobile terminal determines the holding mode according to the number of touch operations received in the edge areas concurrently.

Optionally, the left and right edge areas of the mobile terminal are touch display screens (curved screens). At this time, the mobile terminal receives touch operations through the touch display screen located on the edge areas; or, the left and right edge areas of the mobile terminal are provided with at least one of a pressure sensor, a thermal sensor, and a capacitive sensor. At this time, the mobile terminal receives a touch operation through the at least one sensor.

When the user uses the right-hand holding mode to hold the mobile terminal, the number of touch operations received concurrently in the left edge area is usually greater than the number of touch operations received concurrently in the right edge area; when the user uses the left-hand holding mode to hold the mobile terminal, the number of touch operations received concurrently in the right edge area is usually greater than the number of touch operations received concurrently in the left edge area. When the user uses both hands to hold the mobile terminal, the number of touch operations received concurrently in the left edge area is usually equal to the number of touch operations received concurrently in the right edge area.

According to the above holding rules, when the number of touch operations received by the mobile terminal in the left edge area is greater than the number of touch operations received in the right edge area, it is determined that the holding mode is right-hand holding; when the number of touch operations received by the mobile terminal in the right edge area is greater than the number of touch operations received in the left edge area, it is determined that the holding mode is left-hand holding; when the number of touch operations received by the mobile terminal in the left edge area is equal to the number of touch operations received in the right edge area When the number of operations, determine that the holding mode is two-hand holding.

Of course, the mobile terminal can also determine the holding mode in other ways, and this embodiment will not list them one by one here.

The mobile terminal determines the first operation area and the second operation area according to the holding mode, including: when the holding mode is right-hand holding, determining that the second operation area includes the right-hand edge area, and the area of the right-hand edge area in the second operation area is greater than a first preset value; when the holding mode is left-hand holding, it is determined that the second operation area includes the left-hand edge area, and the area of the left-hand edge area in the second operation area is greater than a second preset value; when the holding mode is two-hand holding, it is determined that the second operation area includes the left-hand edge area and the right-hand edge area, and the area of the left-hand edge area in the second operation area is greater than a third preset value, and the area of the right-hand edge area in the second operation area is greater than a fourth preset value.

The first preset value, the second preset value, the third preset value, and the fourth preset value are all greater than 0. And the first preset value, the second preset value, the third preset value, and the fourth preset value may be the same or different. This embodiment does not limit the values of the first preset value, the second preset value, the third preset value, and the fourth preset value.

Optionally, the first preset value, the second preset value, the third preset value, and the fourth preset value may be user-defined; or, may be set by the mobile terminal by default.

The left-hand edge area refers to the edge area touched by the left palm in the touch display screen; the right-hand edge area refers to the edge area touched by the right palm in the touch display screen.

Optionally, the left-hand edge area may be one of a left edge area, a right edge area, an upper edge area, and a lower edge area; the right-hand edge area is an edge area opposite to the left-hand edge area.

When the user applies the right-hand holding to the mobile terminal, the right hand touches the right-hand edge area by mistake in a larger range; when the left-hand holding is applied to the mobile terminal, the left hand touches the right-hand edge area by mistake in a larger range. So when the holding mode is right-hand holding, it is determined that the second operation area includes the right-hand edge area, and the area of the right-hand edge area in the second operation area is larger than the first preset value, thereby reducing the probabilities of responses of the mobile terminal to the operations by mistake on the right-hand edge area. Similarly, when the holding mode is left-hand holding, it is determined that the second operation area includes the left-hand edge area, and the area of the left-hand edge area in the second operation area is greater than the second preset value, thereby reducing the probabilities of responses of the mobile terminal to the operations by mistake on the left-hand edge area. Similarly, when the holding mode is two-hand holding, it is determined that the second operation area includes the left-hand edge area and the right-hand edge area, and the area of the left-hand edge area in the second operation area is greater than the third preset value, and the area of the right-hand edge area in the second operation area is larger than the fourth preset value, thereby reducing the probabilities of responses of the mobile terminal to the operations by mistake on the left-hand edge area, also reducing the probabilities of responses of the mobile terminal to the operations by mistake on the right-hand edge area.

Figure 16:
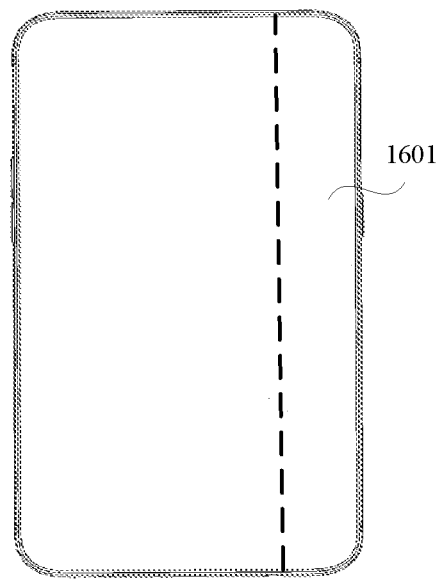
FIG. 16 is a schematic diagram illustrating a second operation area according to one example embodiment of the present disclosure.

In an example, referring to FIG. 16, the mobile terminal determines that the holding mode is right-hand holding, and the second operation area includes a right-hand edge area 1601, and an area of the right-hand edge area 1601 is larger than a first preset value.

Figure 17:
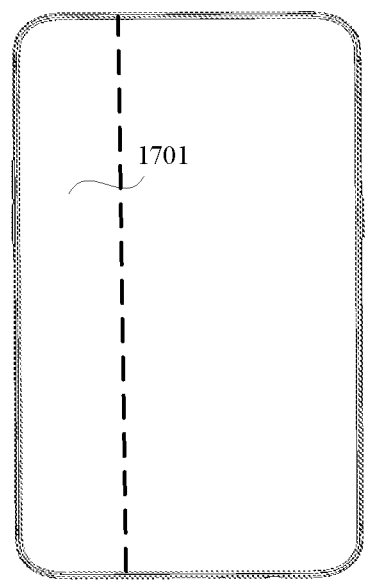
FIG. 17 is a schematic diagram illustrating a second operation area according to one example embodiment of the present disclosure.

In one example, referring to FIG. 17, the mobile terminal determines that the holding mode is left-hand holding, and the second operation area includes a left-hand edge area 1701, and an area of the left-hand edge area 1701 is larger than a second preset value.

Figure 18:
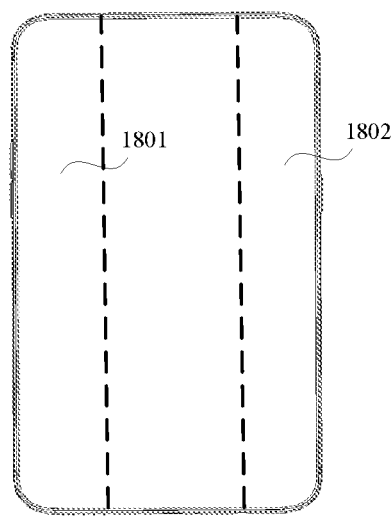
FIG. 18 is a schematic diagram illustrating a second operation area according to one example embodiment of the present disclosure.

In an example, referring to FIG. 18, the mobile terminal determines that the holding mode is a two-hand holding mode, and the second operation area includes a left-hand edge area 1801 and a right-hand edge area 1802. The area of the left-hand edge area 1801 is greater than the third preset value. The area of the side edge area 1802 is larger than the fourth preset value.

It is noted that, the examples of using the foregoing method for determining the first operation area and the second operation area according to the holding mode are for illustrative purposes only. In actual implementations, the method for determining the first operation area and the second operation area according to the holding mode may be implemented differently. For example: when the holding mode is right-hand holding, it is determined that the second operation area includes the right-hand edge area and the left-hand edge area, and the area of the right-hand edge area is larger than the area of the left-hand edge area; when the holding mode is left-hand holding, it is determined that the second operation area includes the right-hand edge area and the left-hand edge area, and the area of the right-hand edge area is smaller than the area of the left-hand edge area; when the holding mode is two-hand holding, it is determined that the second operation area includes the right-hand edge area and the left-hand edge area, and the area of the right-hand edge area is equal to the area of the left-hand edge area; this embodiment does not limit the manner of determining the first operation area and the second operation area according to the holding mode.

Second manner: determining the display mode of the mobile terminal; determining the first operation area and second operation area according to the display mode.

Optionally, the mobile terminal determines the display mode, including but not limited to the following ways.

First way: the mobile terminal obtains the instruction information of the display mode, and determines the corresponding display mode according to the indication information.

Optionally, the instruction information is represented by a character string. Schematically, the instruction information "00" indicates a vertical screen display; the instruction information "01" indicates a inverted vertical screen display; the instruction information "10" indicates a horizontal screen display; the instruction information "11" indicates a inverted horizontal screen display.

Second way: the mobile terminal obtains acceleration information and determines the corresponding display mode based on the acceleration information.

Optionally, an acceleration sensor, such as a gravity sensor (G-sensor), is installed in the mobile terminal, and the acceleration sensor is used to collect acceleration information of the mobile terminal. The acceleration information is used to indicate the attitude of the mobile terminal. Since the mobile terminal uses a specific display mode to display the display interface, the user will rotate the mobile terminal to the corresponding attitude to view the display interface. Therefore, the display mode of the mobile terminal can be determined by obtaining the attitude of the mobile terminal.

For example: when the acceleration data is (0, 9.81, 0), the corresponding display mode is positive vertical screen display; when the acceleration data is (−9.81, 0, 0), the corresponding display mode is positive horizontal screen display; when the acceleration data is (9.81, 0, 0), the corresponding display mode is inverted horizontal screen display; when the acceleration data is (0, −9.81, 0), the corresponding display mode is inverted vertical screen display.

Of course, the mobile terminal can also determine the display mode by other methods, which will not be enumerated in this embodiment.

Optionally, the mobile terminal determines the first operation area and the second operation area according to the display mode, including: when the display mode is a vertical screen display, the second operation area includes a left edge area and a right edge area; when the display mode is a horizontal screen display, the second operation area includes the upper edge area and the lower edge area.

Because when the display mode of the mobile terminal is horizontal screen display, the range of touching by mistake is relatively large in the upper edge area and the lower edge area, therefore, when the display mode is horizontal screen display, it is determined that the second operation area includes the left edge area and the right edge area. In this way, the probability of responding to operations by mistake on the upper edge area and the lower edge area is reduced. When the display mode is vertical screen display, it is determined that the second operation area includes the left edge area and the right edge area, so that the probability of responding to operations by mistake on the left edge area and the right edge area is reduced.

Figure 19:
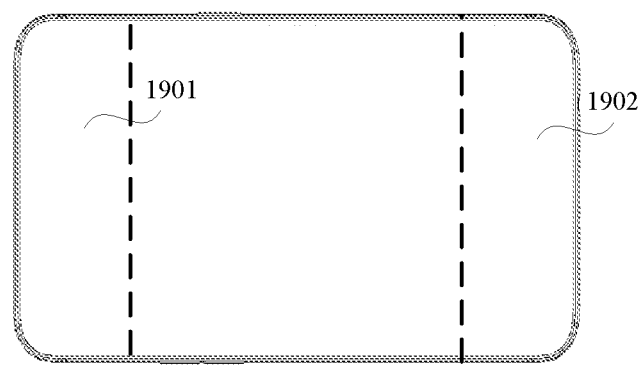
FIG. 19 is a schematic diagram illustrating a second operation area according to one example embodiment of the present disclosure.

In one example, referring to FIG. 19, the display mode is a horizontal screen display, and the second operation area includes an upper edge area 1901 and a lower edge area 1902.

Figure 20:
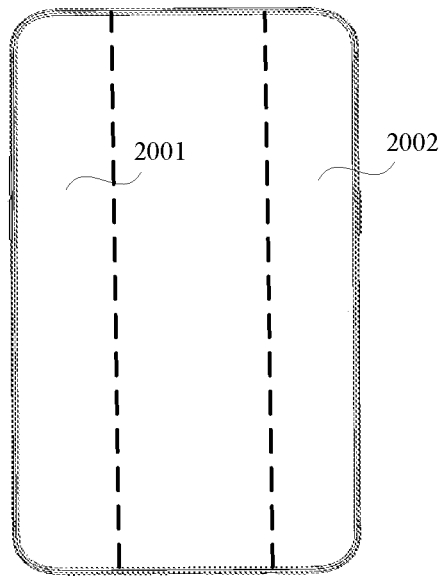
FIG. 20 is a schematic diagram illustrating a second operation area according to one example embodiment of the present disclosure.

In one example, referring to FIG. 20, the display mode is a vertical screen display, and the second operation area includes a left edge area 2001 and a right edge area 2002.

It is noted that, the examples of using the foregoing method for determining the first operation area and the second operation area according to the display mode are for illustrative purposes only. In actual implementations, the method for determining the first operation area and the second operation area according to the display mode may be implemented differently. For example: when the display mode is vertical screen display, the second operation area includes the left edge area, right edge area, upper edge area, and lower edge area. The area of the left edge area and the area of the right edge area are larger than the area of the upper edge area. The area of the left edge area and the area of the right edge area are larger than the area of the lower edge area. When the display mode is horizontal screen display, the second operation area includes the left edge area, right edge area, upper edge area, and lower edge area. The area of the upper edge area and the area of the lower edge area are larger than the area of the left edge area. The area of the upper edge area and the area of the lower edge area are larger than the area of the right edge area. This embodiment does not limit the ways of determining the first operation area and second operation area according to the display mode.

Third manner: determining the implementation scenario of the mobile terminal; determining the first operation area and second operation area according to the implementation scenario.

Optionally, the implementation scenario of the mobile terminal includes an application program currently running on the mobile terminal.

Optionally, determining the implementation scenario by the mobile terminal includes: obtaining a package name corresponding to a currently running main activity; and determining a corresponding application program according to the package name.

Optionally, determining the first operation area and the second operation area according to the implementation scenario includes: responsive to determining that the applications currently running on the mobile terminal are video playback applications and game applications, determining that the second operation area includes the upper edge area and the lower edge area; responsive to determining that the application currently running on the mobile terminal is a voice call application, determining that the second operation area includes the left edge area and the right edge area.

When the user uses a video playback application or a game application, the display mode of the mobile terminal is usually a horizontal screen display, and the user holds the terminal in a two-hand holding mode. At this time, the range of touching by mistake is relatively larger in the upper edge area and the lower edge area. Therefore, when the mobile terminal's currently running applications are video playback applications and game applications, by determining that the second operation area includes the upper edge area and the lower edge area, the probability of responding of the mobile terminal to operations by mistake in the upper edge area and the lower edge area is reduced.

When the user uses a voice call application, the display mode of the mobile terminal is usually a vertical screen display. At this time, a range of touching by mistake in the left edge area and the right edge area is relatively larger. Therefore, when the current application of the mobile terminal is a voice call application, it is determined that the second operation area includes the left edge area and the right edge area, thereby reducing the probability of the mobile terminal responding to operations by mistake on the left edge area and the right edge area.

It is noted that, the examples of using the foregoing method for determining the first operation area and the second operation area according to the implementation scenario are for illustrative purposes only. In actual implementations, the method for determining the first operation area and the second operation area according to the implementation scenario may be implemented differently. For example: determining the first operation area and the second operation area according to other types of applications, this embodiment does not limit the manner of determining the first operation area and the second operation area according to the implementation scenario.

Optionally, in the present disclosure, the first operation area and the second operation area may be determined according to at least one of a holding mode, a display mode, and an implementation scenario.

At 1502: receiving a first touch operation and a second touch operation on the touch display screen during a preset time period.

For a detailed description of this step, refer to step 701, which is not described in this embodiment.

At 1503: determining the operation on which with the first touch operation is applied. The operation area on which the first touch operation is applied is one of the first operation area and the second operation area.

For a detailed description of this step, refer to step 702, which is not described in this embodiment.

At 1504: determining the operation area on which the second touch operation is applied. The operation area on which the second touch operation is applied is one of the first operation area and the second operation area.

For a detailed description of this step, refer to step 703, which is not described in this embodiment.

At 1505: determining whether to respond to the first touch operation and/or the second touch operation according to the operation area on which the first touch operation is applied and the operation area on which the second touch operation is applied.

For a detailed description of this step, refer to step 704, which is not described in this embodiment.

In summary, the touch operation response method provided in this embodiment, when the mobile terminal receives at least two counts of touch operations, determines whether to respond to a touch operation according to the operation area on which each count of touch operation acts, solving the problem of wasting the operating resources of the mobile terminal caused by mistaking touch operation when the mobile terminal responds directly to the touch operation as long as a touch operation is received. Because the mobile terminal can determine whether to respond to a touch operation based on whether the operation area is an area with a high probability of a touch operation by mistake, the probability of the mobile terminal responding to operations by mistake is therefore reduced.

In addition, the first operation area and the second operation area are determined in different ways, so that the first operation area and the second operation area can dynamically adapt to the current usage of the mobile terminal, and the flexibility of configuring the first operation area and the second operation area is improved.

Optionally, in the above touch operation response method, when the mobile terminal receives at least two counts of touch operations, it can only determine whether to respond to touch operations on different operation areas. For different operations on the same operation area, the mobile terminal cannot determine whether to respond to different touch operation.

In order to ensure that the mobile terminal can determine whether to respond to different touch operations acting on the same operation area, the following embodiments are also provided in this application.

Figure 21:
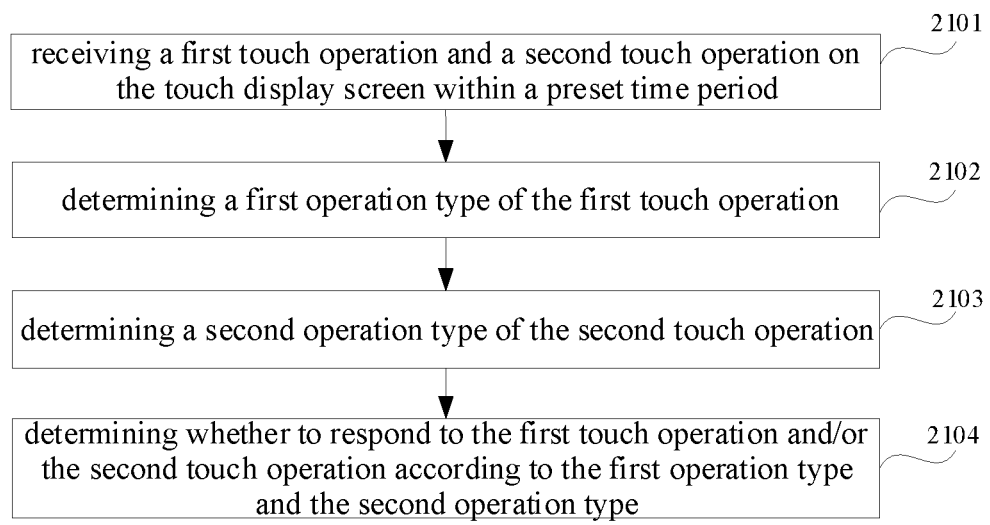
FIG. 21 is a schematic flowchart of a touch operation response method according to one example embodiment of the present disclosure.

FIG. 21 provides a flowchart of a touch operation response method according to an example embodiment of the present disclosure. The touch operation response method includes the following steps.

At 2101: receiving a first touch operation and a second touch operation on the touch display screen within a preset time period.

For a detailed description of this step, refer to step 701, which is not described in this embodiment.

At 2102: determining a first operation type of the first touch operation.

The operation type (including the first operation type and the second operation type) is one of a click type, a slide type, and a long-press type.

Optionally, the mobile terminal determines the operation type of the touch operation according to the touch duration and/or displacement of the touch operation (including the first touch operation and the second touch operation).

Schematically, when the touch duration is less than or equal to the first duration threshold and the displacement does not change, the operation type of the touch operation is determined as a click type; when the touch duration is greater than the first duration threshold, less than or equal to the second duration threshold, and the displacement changes, the touch operation is determined as a sliding operation; when the touch duration is greater than the first duration threshold, less than or equal to the third duration threshold, and the displacement does not change, the touch operation is determined as a long-press operation.

At 2103: determining a second operation type of the second touch operation.

For a detailed description of this step, refer to step 2102, which is not described in this embodiment.

At 2104: determining whether to respond to the first touch operation and/or the second touch operation according to the first operation type and the second operation type.

Optionally, the response priority of the first operation type is higher than the response priority of the second operation type, and the mobile terminal determines whether to respond to the first touch operation and/or the second touch operation according to the first operation type and the second operation type, including: respond to the first touch operation and does not respond to the second touch operation; or, after responding to the first touch operation, respond to the second touch operation.

The first operation type is a click type, the second operation type is at least one of a slide type and a long-press type; or, the first operation type is a slide type, and the second operation type is a long-press type.

Because in the process of using the mobile terminal, the probability of a touch operation in long-press type being an operation by mistake is higher than the probability of a touch operation in slide type being an operation by mistake, which is higher than the probability of a touch operation in click type being an operation by mistake, therefore, in this embodiment, by only responding or preferentially responding to a touch operation with a lower probability of operations by mistake, the probability of the mobile terminal responding to operations by mistake is reduced.

Optionally, when the first operation type and the second operation type are both long-press types, the probability that both the first touch operation and the second touch operation are operations by mistake is large. Therefore, when the first operation type and the second operation type are both long-press types, the first touch operation and the second touch operation are not responded, thereby reducing the probability that the mobile terminal responds to operations by mistake.

In summary, the touch operation response method provided in this embodiment, when the mobile terminal receives at least two counts of touch operations, determines whether to respond to the corresponding touch operation according to the operation type of each touch operation; solving the problem of wasting the operating resources of the mobile terminal caused by mistaking touch operation when the mobile terminal responds directly to the touch operation as long as a touch operation is received. Because the mobile terminal can, based on whether the operation type is a type that has a higher probability of being a touch operation by mistake, determine whether to respond to a touch operation, the probability of the mobile terminal responding to operations by mistake is reduced.

Optionally, referring to FIG. 21, the response priority of the operation type fixed as the click type is higher than the response priority of the slide type, which is higher than the response priority of the long-press type. However, in some implementation scenarios, the response priority of the operation type will be different. For example, in a chat interface scenario, the probability of a touch operation in slide type being operations by mistake is higher than the probability of a touch operation in long-press type being operations by mistake, which is higher than the probability of a touch operation in click type being operations by mistake. At this time, the response priority of the click type is higher than the response priority of the long-press type, which is higher than the response priority of the slide type. Therefore, in order to reduce the probability of the response of the mobile terminal to operations by mistake, the following examples are also provided in the present disclosure.

Figure 22:
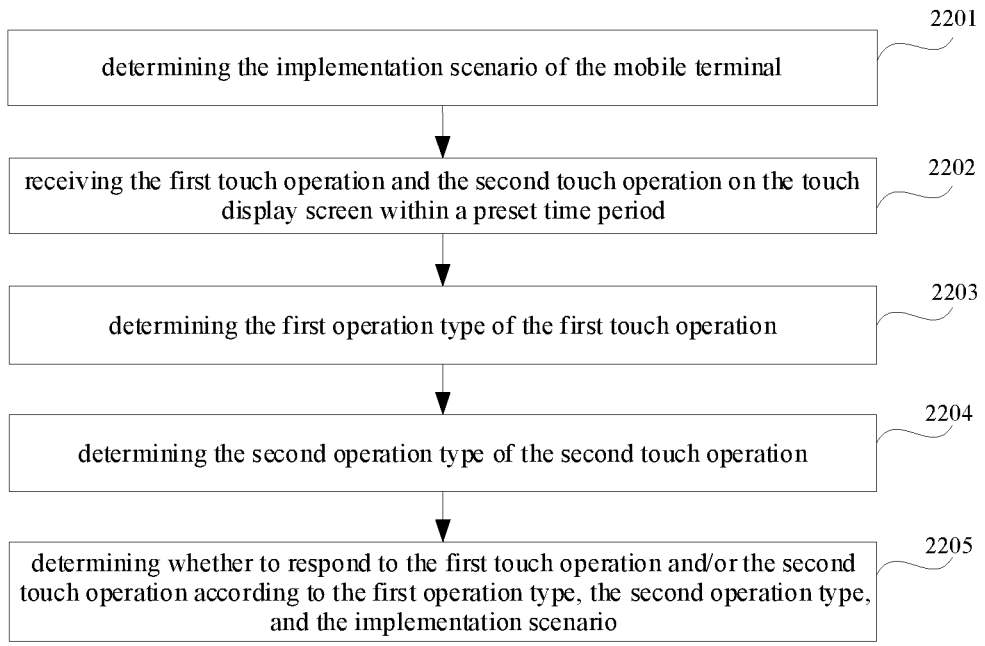
FIG. 22 is a schematic flowchart of a touch operation response method according to one example embodiment of the present disclosure.

FIG. 22 is a flowchart of a touch operation response method according to another example embodiment of the present disclosure. The touch operation response method includes the following steps.

At 2201: determining the implementation scenario of the mobile terminal.

For a detailed description of this step, refer to step 1501, which is not described in this embodiment.

At 2202: receiving the first touch operation and the second touch operation on the touch display screen within a preset time period.

For a detailed description of this step, refer to step 701, which is not described in this embodiment.

At 2203: determining the first operation type of the first touch operation.

For a detailed description of this step, refer to step 2102, which is not described in this embodiment.

At 2204: determining the second operation type of the second touch operation.

For a detailed description of this step, refer to step 2102, which is not described in this embodiment.

At 2205: determining whether to respond to the first touch operation and/or the second touch operation according to the first operation type, the second operation type, and the implementation scenario.

The mobile terminal determines the response priority of the first operation type and the response priority of the second operation type according to the implementation scenario; determines whether to respond to the first touch operation and/or the second touch operation according to the response priority of the first operation type and the response priority of the second operation type operation.

Optionally, the implementation scenario is the first preset scenario, and it is determined that the response priority of the click type is higher than the response priority of the slide type, which is higher than the response priority of the long-press type; or, the implementation scenario is the second preset scenario, and it is determined that the response priority of the click type is higher than the response priority of the long-press type, which is higher than the response priority of the slide type; or, the implementation scenario is the third preset scenario, and it is determined that the response priority of the slide type is higher than the response type of the click type, which is higher than the response priority of the long-press type.

Optionally, the first preset scenario includes at least one program type, at least one application program, and/or at least one display interface. For example, the first preset scenario includes a main interface and a shopping application.

Optionally, the second preset scenario includes at least one program type, at least one application program, and/or at least one display interface. For example, the second preset scene includes a chat interface.

Optionally, the third preset scenario includes at least one program type, at least one application program, and/or at least one display interface. For example, the third preset scene includes a game interface.

The description of determining whether to respond to the first touch operation and/or the second touch operation according to the response priority of the first operation type and the response priority of the second operation type is described in details in step 2104, which is not described in detail in this embodiment.

In summary, the touch operation response method is provided in this embodiment. When the mobile terminal receives at least two counts of touch operations, it determines whether to respond to the corresponding touch operation according to the operation type of each count of touch operation, solving the problem of wasting the operating resources of the mobile terminal caused by mistaking touch operation when the mobile terminal responds directly to the touch operation as long as a touch operation is received.

Because the mobile terminal can, based on whether the operation type is a type that has a higher probability of being a touch operation by mistake, determine whether to respond to the touch operation, the probability of the mobile terminal responding to operations by mistake is reduced.

In addition, by determining the response priority of the operation type according to the implementation scenario, the mobile terminal can flexibly switch the response priority of the operation type according to different implementation scenarios, thereby reducing the probability that the mobile terminal responds to operations by mistake.

Optionally, in order to improve the accuracy of the mobile terminal's response to the touch operation, in the present disclosure, the mobile terminal combines the aspect of the operation area of the touch operation and the aspect of the operation type of the touch operation to determine whether to respond to the touch operation. The following examples are also provided in the present disclosure.

Figure 23:
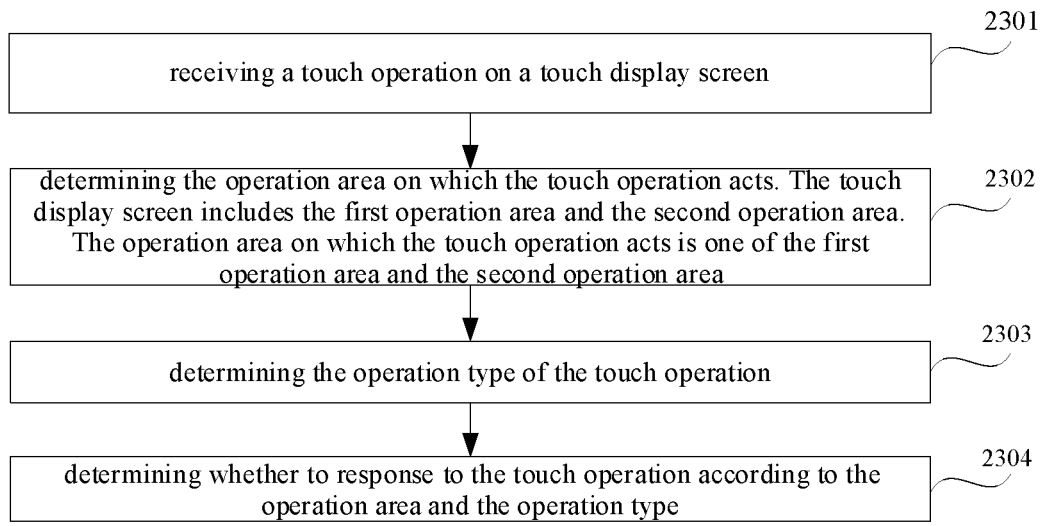
FIG. 23 is a schematic flowchart of a touch operation response method according to one example embodiment of the present disclosure.

FIG. 23 is a flowchart of a touch operation response method according to another example embodiment of the present disclosure. The touch operation response method includes the following steps.

At 2301: receiving a touch operation on a touch display screen.

Optionally, the mobile terminal receives at least one touch operation on the touch display screen. For a detailed description of this step, refer to step 701, which is not described in this embodiment.

At 2302: determining the operation area on which the touch operation acts. The touch display screen includes the first operation area and the second operation area. The operation area on which the touch operation acts is one of the first operation area and the second operation area.

For a detailed description of this step, refer to step 702, which is not described in this embodiment.

At 2303: determining the operation type of the touch operation.

For a detailed description of this step, refer to step 2102, which is not described in this embodiment.

At 2304: determining whether to response to the touch operation according to the operation area and the operation type.

The response priority of the touch operation acting on the first operation area is higher than the response priority of the touch operation acting on the second operation area. The operation types include click type, slide type, and long-press type.

In the first scenario, the touch operation on the touch display screen is a touch operation. At this time, when the operation area of the touch operation is the first operation area, the touch operation is responded to. Since the probability of operations acting on the first operation area being operations by mistake is low, the probability of the response of the mobile terminal to operations by mistake is relatively lower.

When the operation area is the second operation area and the operation type is click type or slide type, the touch operation is responded to; when the operation area is the second operation area and the operation type is long-press type, the touch operation is not responded to.

Because the probability of long-press type is operations by mistake, and the probability of touch operation on the second operation area is operations by mistake, so when the operation area is second operation area, and the operation type is long-press When type, it does not respond to touch operation, which reduces the probability that the mobile terminal responds to operations by mistake.

Because the probability of long-press type being operations by mistake is relatively larger, and the probability of touch operation on the second operation area being operations by mistake is relatively lower, therefore, when the operation area is second operation area, and the operation type is long-press type, the touch operation is not responded to, thereby reducing the probability that the mobile terminal responds to operations by mistake.

In the second scenario, the touch operations on the touch display screen are at least two counts of touch operations. At this time, in step 2301, the mobile terminal receives the first touch operation and the second touch operation on the touch display screen; in step 2302, the mobile terminal determines the operation area on which the first touch operation acts; determines the operation area on which the second touch operation acts; in step 2303, the mobile terminal determines the first operation type of the first touch operation; determines the second operation type of the second touch operation.

Optionally, response rules are stored in the mobile terminal, and the response rules are used to indicate whether to respond to a touch operation in a specific operation area and having a specific operation type. Referring to the response rules shown in FIG. 24, according to the response rules, when the mobile terminal receives both the first touch operation and the second touch operation, if the operation type of the first touch operation is the same as the operation type of the second touch operation, or if the operation type of the first touch operation type is click type or slide type, then the mobile terminal responds preferentially to the first touch operation. If the operation type of the first touch operation is different from the operation type of the second touch operation, and the operation type of the first touch operation is long-press type, then the mobile terminal preferentially responds to the second touch operation. When the mobile terminal receives only the first touch operation, it responds to the first touch operation. When the mobile terminal receives only the second touch operation, and the operation type of the second touch operation is click type or slide type, it responds to the second touch operation; when the mobile terminal receives only the second touch operation, and the operation type of the second touch operation is long-press type, it does not respond to the second touch operation.

Optionally, a response priority corresponding to an operation area and a response priority corresponding to an operation type are pre-stored in the mobile terminal. At this time, when the operation area on which the first touch operation is applied is the first operation area, the operation area on which the second touch operation is applied is the second operation area, and the response priority of the second operation type is higher than the response priority of the first operation type, i.e., the response priority corresponding to the operation area is opposite to the response priority corresponding to the operation type, the mobile terminal determines the priority level of the operation area and the priority level of the operation type; determines whether to respond to the first touch operation and/or the second touch operation according to the priority level.

The priority level is used to indicate a response to a touch operation according to a response priority corresponding to the operation area; or the priority level is used to indicate a response to a touch operation according to a response priority corresponding to the operation type.

Specifically, the response priority of the click type is higher than the response priority of the slide type, which is higher than the response priority of the long-press type.

Schematically, when the first operation type is click type or slide type, it is determined that the priority level of the operation area is higher than the priority level of the operation type. At this time, the mobile terminal responds to the first touch operation and/or the second touch operation according to the response priority corresponding to the operation area.

For example, the first operation type is slide type and the second operation type is click type. At this time, the response priority of the first touch operation on the first operation area is higher than the response priority of the second touch operation on the second operation area. The response priority of the first touch operation with the first operation type is lower than the response priority of the second touch operation with the second operation type. The mobile terminal determines that the priority level of the operation area is higher than the priority level of the operation type, i.e., the mobile terminal preferentially responds to the first touch operation and then the second touch operation according to the response priority corresponding to the operation area; or only responds to the first touch operation.

Schematically, when the first operation type is long-press type, it is determined that the priority level of the operation type is higher than the priority level of the operation area.

For example: the first operation type is long-press type and the second operation type is click type. At this time, the response priority of the first touch operation on the first operation area is higher than the response priority of the second touch operation on the second operation area; the response priority of the first touch operation with the first operation type is lower than the response priority of the second touch operation with the second operation type. The mobile terminal determines that the priority level of the operation area is lower than the priority level of the operation type, i.e., the mobile terminal responds preferentially to the second touch operation and then to the first touch operation according to the response priority corresponding to the operation area; or, only responds to the second touch operation.

In summary, the touch operation response method provided in this embodiment determines whether to respond to a touch operation according to the operation type of the touch operation and the operation area on which it acts, solving the problem of wasting the operating resources of the mobile terminal caused by mistaking touch operation when the mobile terminal responds directly to the touch operation as long as a touch operation is received. Because the mobile terminal can combine an aspect of whether the operation area is an area with a high probability of having touch operations by mistake, and an aspect of whether the operation type is a type with a high probability of having touch operations by mistake, to determine whether to respond to the touch operation, thereby reducing the probability of the mobile terminal responding to operations by mistake.

Optionally, when the mobile terminal receives at least three counts of touch operations at the same time, for any two counts of touch operations out of the at least three counts of touch operations, the above process is performed until it is determined which touch operation to respond to.

Optionally, the first operation area and the second operation area on the touch display screen may be set by default when the mobile terminal leaves the factory; or may be determined according to a user's holding mode of the mobile terminal and/or posture information of the mobile terminal. In this embodiment, the first operation area and the second operation area are determined according to the holding mode of the mobile terminal and/or the display mode of the mobile terminal and/or the implementation scenario of the mobile terminal.

Figure 25:
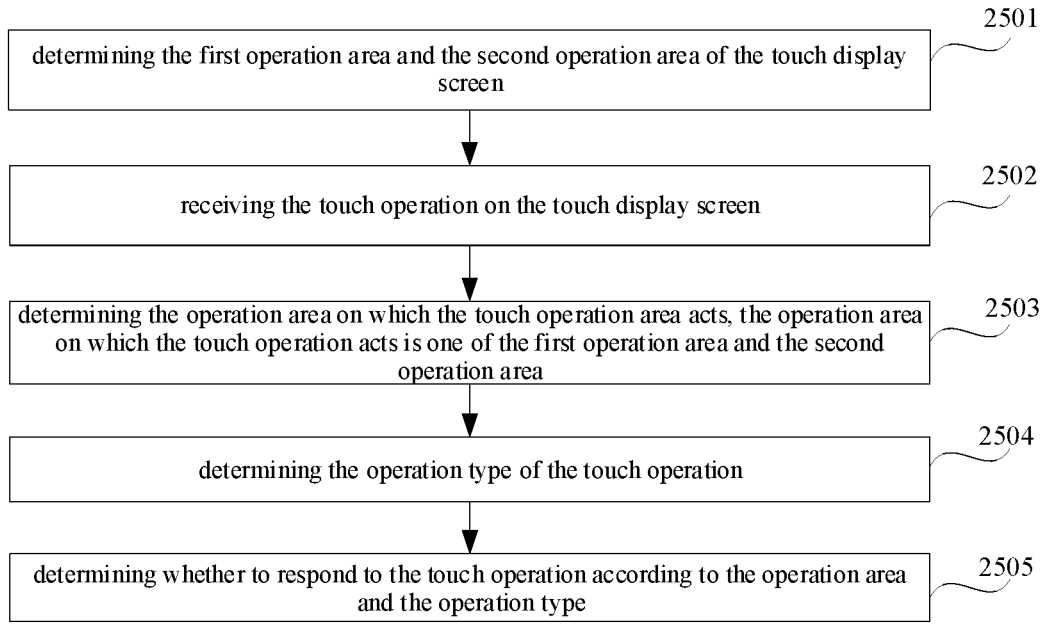
FIG. 25 is a schematic flowchart of a touch operation response method according to one example embodiment of the present disclosure.

FIG. 25 is a flowchart of a touch operation response method according to another example embodiment of the present disclosure. The touch operation response method includes the following steps.

At 2501: determining the first operation area and the second operation area of the touch display screen.

For a detailed description of this step, refer to step 1501, which is not described in this embodiment.

At 2502: receiving the touch operation on the touch display screen.

For a detailed description of this step, refer to step 2301, which is not described in this embodiment.

At 2503: determining the operation area on which the touch operation area acts, the operation area on which the touch operation acts is one of the first operation area and the second operation area.

For a detailed description of this step, refer to step 2302, which is not described in this embodiment.

At 2504: determining the operation type of the touch operation.

For a detailed description of this step, refer to step 2303, which is not described in this embodiment.

At 2505: determining whether to respond to the touch operation according to the operation area and the operation type.

For a detailed description of this step, refer to step 2304, which is not described in this embodiment.

In summary, the touch operation response method provided in this embodiment determines the first operation area and the second operation area in different ways, so that the first operation area and the second operation area can dynamically adapt to the current usage situation of the mobile terminal, thereby improving the flexibility of configuring the first operation area and second operation area.

The following are apparatus embodiments of the present disclosure, which can be used to implement the method embodiments of the present disclosure. For details not disclosed in the apparatus embodiments of the present disclosure, please refer to the method embodiments of the present disclosure.

Figure 26:
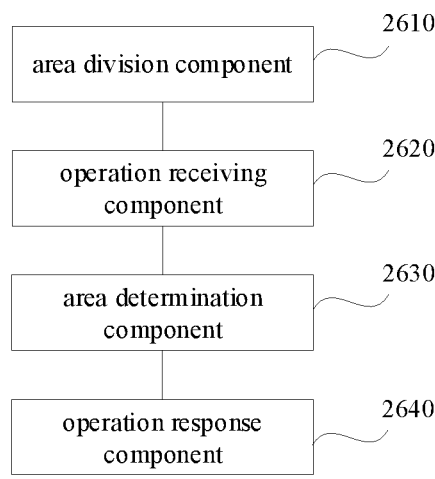
FIG. 26 is a schematic block diagram of a touch operation response device according to one example embodiment of the present disclosure.

Referring to FIG. 26, which shows a structural block diagram of a touch operation response device according to an embodiment of the present disclosure. The touch operation response device may be implemented as part or all of a mobile terminal through software, hardware, or a combination of both. The detection device is suitable for a mobile terminal. The mobile terminal includes a touch display screen. The device may include: an area division component 2610, an operation receiving component 2620, an area determination component 2630, and an operation response component 2640.

The area division component 2610 is configured to determine a first operation area and a second operation area in the touch display screen.

The operation receiving component 2620 is configured to receive a first touch operation and a second touch operation acting on the touch display screen within a preset time period.

The area determination component 2630 is configured to determine an operation area on which the first touch operation acts, and the operation area on which the first touch operation acts is one of the first operation area and the second operation area.

The area determination component 2630 is further configured to determine an operation area on which the second touch operation acts, and the operation area on which the second touch operation acts is one of the first operation area and the second operation area.

The operation response component 2640 is configured to determine whether to respond to the first touch operation and/or the second touch operation according to the operation area on which the first touch operation acts and the operation area on which the second touch operation acts.

Optionally, the area division component 2610 is configured to:

determine a holding mode corresponding to the mobile terminal, where the holding mode is one of left-hand holding, right-hand holding, and two-hand holding;

determine the first operation area and the second operation area according to the holding mode.

Optionally, the area division component 2610 is configured to:

determine a display mode of the mobile terminal, where the display mode includes a horizontal screen display and a vertical screen display;

determine the first operation area and the second operation area according to the display mode.

Optionally, the area division component 2610 is configured to:

determine an implementation scenario of the mobile terminal, where the implementation scenario includes an application program currently running on the mobile terminal;

determine the first operation area and the second operation area according to the implementation scenario.

Optionally, the response priority of the touch operation acting on the first operation area is higher than the response priority of the touch operation acting on the second operation area; the operation area on which the first touch operation acts is different from the operation area on which the second touch operation acts.

The embodiments of the present disclosure further provide a computer-readable medium, which stores program instructions, and when the program instructions are executed by a processor, the touch operation response method provided by the foregoing method embodiments is implemented.

Another aspect of the present disclosure also provides a computer program product containing program instructions, which when run on a computer, causes the computer to perform the methods described in the above aspects.

The various embodiments can be implemented, in part or as a whole, by software, hardware or the combinations thereof. The foregoing methods can be performed by modules embedded in or independent from a processor of a base station and in the form of hardware, or be stored in a memory of a base station and in the form of software, so as to facilitate the processor to call and execute corresponding steps of the foregoing various modules. The processor can be a central processing unit (CPU), a microprocessor, a micro-controller unit, and so on.

A person skilled in the art should understand that the processes of the methods in the above embodiments can be, in full or in part, implemented by computer programs instructing underlying hardware, the programs can be stored in a non-volatile computer-readable storage medium, the program can include the processes in the embodiments of the various methods when it is being executed. The storage medium can be a disk, a CD, a Read-Only Memory (ROM).

Although the respective embodiments have been described one by one, it shall be appreciated that the respective embodiments will not be isolated. Those skilled in the art can apparently appreciate upon reading the disclosure of the application that the respective technical features involved in the respective embodiments can be combined arbitrarily between the respective embodiments as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of touch operation response, applied to a mobile terminal, the mobile terminal comprising a touch display screen, and the method comprising:

determining a first operation area and a second operation area in the touch display screen;

receiving a first touch operation and a second touch operation on the touch display screen within a preset time period;

determining an operation area on which the first touch operation is applied, the operation area on which the first touch operation is applied being the first operation area or the second operation area;

determining an operation area on which the second touch operation is applied, the operation area on which the second touch operation is applied being the first operation area or the second operation area;

determining operation types of the first touch operation and the second touch operation, the operation types comprising at least one of click type, slide type, or long-press type; and determining whether responding to the first touch operation or the second touch operation based on the operation types of the first touch operation and the second touch operation and the operation area on which the first touch operation is applied and the operation area on which the second touch operation is applied;

wherein determining the first operation area and the second operation area in the touch display screen comprises one of:

determining a display mode of the mobile terminal, the display mode comprising a horizontal screen display and a vertical screen display; and determining the first operation area and the second operation area based on the display mode; or determining an implementation scenario of the mobile terminal, the implementation scenario comprising a current running application program of the mobile terminal; and determining the first operation area and the second operation area based on the implementation scenario.

2. The method according to claim 1, further comprising determining whether responding to the first touch operation and the second touch operation based on the operation area on which the first touch operation is applied and the operation area on which the second touch operation is applied.

3. The method according to claim 1, wherein a response priority of a touch operation on the first operation area is higher than a response priority of a touch operation on the second operation area.

4. The method according to claim 3, wherein an operation area on which the first touch operation is applied is different from an operation area on which the second touch operation is applied.

5. A mobile terminal, wherein the mobile terminal comprises a processor, a storage medium connected with the processor, and computer-executable instructions stored in the storage medium, the processor executing the instructions is configured to:
- determine a first operation area and a second operation area in a touch display screen;
- receive a first touch operation and a second touch operation on the touch display screen within a preset time period;
- determine an operation area on which the first touch operation is applied, the operation area on which the first touch operation is applied being the first operation area or the second operation area;
- determine an operation area on which the second touch operation is applied, the operation area on which the second touch operation is applied being the first operation area or the second operation area;
- determine operation types of the first touch operation and the second touch operation, the operation types comprising at least one of click type, slide type, or long-press type; and
- determine whether responding to the first touch operation or the second touch operation based on the operation types of the first touch operation and the second touch operation and the operation area on which the first touch operation is applied and the operation area on which the second touch operation is applied;

wherein the processor configured to determine the first operation area and the second operation area in the touch display screen is configured to:
- determine a display mode of the mobile terminal, the display mode comprising a horizontal screen display and a vertical screen display; and determine the first operation area and the second operation area based on the display mode; or
- determine an implementation scenario of the mobile terminal, the implementation scenario comprising a current running application program of the mobile terminal; and
- determine the first operation area and the second operation area based on the implementation scenario.

6. The mobile terminal according to claim 5, wherein the processor is configured to determine whether responding to the first touch operation and the second touch operation based on the operation area on which the first touch operation is applied and the operation area on which the second touch operation is applied.

7. The mobile terminal according to claim 5, wherein a response priority of a touch operation on the first operation area is higher than a response priority of a touch operation on the second operation area.

8. The mobile terminal according to claim 7, wherein an operation area on which the first touch operation is applied being different from an operation area on which the second touch operation is applied.

9. A non-transitory computer-readable storage medium comprising instructions that, when executed by a computer, cause the computer to:
- determine a first operation area and a second operation area in a touch display screen;
- receive a first touch operation and a second touch operation on the touch display screen within a preset time period;
- determine an operation area on which the first touch operation is applied, the operation area on which the first touch operation is applied being the first operation area or the second operation area;
- determine an operation area on which the second touch operation is applied, the operation area on which the second touch operation is applied being the first operation area or the second operation area;
- determine operation types of the first touch operation and the second touch operation, the operation types comprising at least one of click type, slide type, and long-press type; and
- determine whether responding to the first touch operation or the second touch operation based on the operation types of the first touch operation and the second touch operation and the operation area on which the first touch operation is applied and the operation area on which the second touch operation is applied;

wherein the instructions that, when executed by the computer, cause the computer to determine the first operation area and the second operation area in the touch display screen cause the computer to:
- determine a display mode of the mobile terminal, the display mode comprising a horizontal screen display and a vertical screen display; and determine the first operation area and the second operation area based on the display mode; or
- determine an implementation scenario of the mobile terminal, the implementation scenario comprising a current running application program of the mobile terminal; and
- determine the first operation area and the second operation area based on the implementation scenario.

10. The non-transitory computer-readable storage medium according to claim 9, wherein the computer is caused to determine whether responding to the first touch operation and the second touch operation based on the operation area on which the first touch operation is applied and the operation area on which the second touch operation is applied.

11. The non-transitory computer-readable storage medium according to claim 9, wherein a response priority of a touch operation on the first operation area is higher than a response priority of a touch operation on the second operation area; and an operation area on which the first touch operation is applied being different from an operation area on which the second touch operation is applied.

* * * * *